US010807801B2

(12) United States Patent
Kilibarda et al.

(10) Patent No.: US 10,807,801 B2
(45) Date of Patent: Oct. 20, 2020

(54) INVERTED CARRIER LIFT DEVICE SYSTEM AND METHOD

(71) Applicant: Comau LLC, Southfield, MI (US)

(72) Inventors: Velibor Kilibarda, Southfield, MI (US); William Maybee, Southfield, MI (US); Michael R. Dugas, Brighton, MI (US); Michael L. Gentile, Macomb, MI (US); Matthew P. Sosnowski, Brighton, MI (US); Lei Zhou, Bloomfield Hills, MI (US); Freddie Tappo, Sterling Heights, MI (US); Jeffrey W. Mason, Lake Orion, MI (US); Neil G. Greig, Auburn Hills, MI (US)

(73) Assignee: Comau LLC, Southfield, MI (US)

(*) Notice: Subject to any disclaimer, the term of this patent is extended or adjusted under 35 U.S.C. 154(b) by 0 days.

(21) Appl. No.: 16/507,141

(22) Filed: Jul. 10, 2019

(65) Prior Publication Data

US 2019/0329981 A1 Oct. 31, 2019

Related U.S. Application Data

(62) Division of application No. 15/588,326, filed on May 5, 2017, now Pat. No. 10,384,873.
(Continued)

(51) Int. Cl.
*B65G 13/02* (2006.01)
*B65G 17/20* (2006.01)
(Continued)

(52) U.S. Cl.
CPC ............ *B65G 13/02* (2013.01); *B62D 65/18* (2013.01); *B65G 1/023* (2013.01); *B65G 1/0457* (2013.01);
(Continued)

(58) Field of Classification Search
None
See application file for complete search history.

(56) References Cited

U.S. PATENT DOCUMENTS

| 2,493,005 A | 1/1950 | Williams |
| 2,835,964 A | 5/1958 | Yarwood |

(Continued)

FOREIGN PATENT DOCUMENTS

| CA | 2718907 A1 | 9/2009 |
| CA | 2663307 A1 | 11/2009 |

(Continued)

OTHER PUBLICATIONS

International Preliminary Report of Patentability in corresponding application PCT/2014/064948, dated May 17, 2016.
(Continued)

*Primary Examiner* — William R Harp
(74) *Attorney, Agent, or Firm* — Young Basile Hanlon & MacFarlane, P.C.

(57) ABSTRACT

An inverted carrier lift and method is disclosed. The inverted carrier lift includes a trolley movable along an overhead conveyor and a carrier for supporting a workpiece to undergo an assembly or manufacturing process. The carrier is movable relative to the trolley from a raised position to a lowered position by a motor engaged with a lifting mechanism on the trolley. On rotation of the motor, the carrier and supported workpiece is lowered or raised to position the workpiece in the workstation for processing. The workpiece may be disengaged by the carrier for support of the workpiece by one of many different fixtures depending on the processing. Following processing, the workpiece is re-engaged by the carrier, moved to a raised position and the trolley is transferred to a subsequent workstation.

14 Claims, 25 Drawing Sheets

Related U.S. Application Data

(60) Provisional application No. 62/433,405, filed on Dec. 13, 2016, provisional application No. 62/332,598, filed on May 6, 2016.

(51) Int. Cl.

| | |
|---|---|
| *B65G 19/02* | (2006.01) |
| *B65G 47/61* | (2006.01) |
| *B65G 49/04* | (2006.01) |
| *B62D 65/18* | (2006.01) |
| *B65G 1/02* | (2006.01) |
| *B65G 1/04* | (2006.01) |
| *B65G 1/12* | (2006.01) |
| *B65G 1/14* | (2006.01) |
| *B65G 1/16* | (2006.01) |

(52) U.S. Cl.
CPC ............... *B65G 1/12* (2013.01); *B65G 1/14* (2013.01); *B65G 1/16* (2013.01); *B65G 17/20* (2013.01); *B65G 19/025* (2013.01); *B65G 47/61* (2013.01); *B65G 49/0454* (2013.01); *B65G 49/0463* (2013.01)

(56) References Cited

U.S. PATENT DOCUMENTS

| | | | |
|---|---|---|---|
| 3,444,802 A * | 5/1969 | Barton | B65G 49/0459 454/63 |
| 3,854,889 A | 12/1974 | Lemelson | |
| 4,162,387 A | 7/1979 | De Candia | |
| 4,232,370 A | 11/1980 | Tapley | |
| 4,273,242 A * | 6/1981 | Schaper | B66C 13/06 212/273 |
| 4,328,422 A | 5/1982 | Loomer | |
| 4,344,221 A | 8/1982 | Pagani | |
| 4,369,563 A | 1/1983 | Williamson | |
| 4,400,607 A | 8/1983 | Wakou et al. | |
| 4,442,335 A | 4/1984 | Rossi | |
| 4,456,810 A | 6/1984 | Schumacher et al. | |
| 4,530,056 A | 7/1985 | MacKinnon et al. | |
| 4,600,136 A | 7/1986 | Sciaky et al. | |
| 4,606,488 A | 8/1986 | Yanagisawa | |
| 4,659,895 A | 4/1987 | Di Rosa | |
| 4,667,866 A | 5/1987 | Tobita et al. | |
| 4,679,297 A | 7/1987 | Hansen, Jr. et al. | |
| 4,732,224 A * | 3/1988 | Deeter | E21C 25/58 175/85 |
| 4,734,979 A | 4/1988 | Sakamoto et al. | |
| 4,736,515 A | 4/1988 | Catena | |
| 4,738,387 A | 4/1988 | Jaufmann et al. | |
| 4,774,757 A | 10/1988 | Sakamoto et al. | |
| 4,779,787 A | 10/1988 | Naruse et al. | |
| 4,795,075 A | 1/1989 | Pigott et al. | |
| 4,800,249 A | 1/1989 | Di Rosa | |
| 4,815,190 A | 3/1989 | Haba, Jr. et al. | |
| 4,872,419 A | 10/1989 | Blankemeyer et al. | |
| 4,885,836 A | 12/1989 | Bonomi et al. | |
| 4,896,014 A | 1/1990 | Sakai et al. | |
| 4,928,383 A | 5/1990 | Kaczmarek et al. | |
| 4,967,947 A | 11/1990 | Sarh | |
| 5,011,068 A | 4/1991 | Stoutenburg et al. | |
| 5,123,148 A | 6/1992 | Ikeda et al. | |
| 5,152,050 A | 10/1992 | Kaczmarek et al. | |
| 5,177,862 A * | 1/1993 | Speece | B23P 21/004 29/430 |
| 5,199,156 A | 4/1993 | Rossi | |
| 5,285,604 A | 2/1994 | Carlin | |
| 5,301,411 A | 4/1994 | Fujiwara et al. | |
| 5,319,840 A | 6/1994 | Yamamoto et al. | |
| 5,347,700 A | 9/1994 | Tominaga et al. | |
| 5,397,047 A | 3/1995 | Zampini | |
| 5,427,300 A | 6/1995 | Quagline | |
| 5,433,783 A * | 7/1995 | Ichinose | B65G 49/0459 118/416 |
| 5,531,830 A | 7/1996 | Ichinose et al. | |
| 5,538,382 A | 7/1996 | Hasegawa et al. | |
| 5,560,535 A | 10/1996 | Miller et al. | |
| 5,577,595 A | 11/1996 | Pollock et al. | |
| 5,697,752 A | 12/1997 | Dugas et al. | |
| 5,779,609 A | 7/1998 | Cullen et al. | |
| 5,853,215 A | 12/1998 | Lowery | |
| 5,864,991 A | 2/1999 | Burns | |
| 5,896,637 A | 4/1999 | Sarh | |
| 5,902,496 A | 5/1999 | Alborante | |
| 5,940,961 A | 8/1999 | Parete | |
| 5,943,768 A | 8/1999 | Ray | |
| 6,008,471 A | 12/1999 | Alborante | |
| 6,059,169 A | 5/2000 | Nihei et al. | |
| 6,065,200 A | 5/2000 | Negre | |
| 6,098,268 A | 8/2000 | Negre et al. | |
| 6,132,509 A | 10/2000 | Kuschnereit | |
| 6,138,889 A | 10/2000 | Campani et al. | |
| 6,142,725 A | 11/2000 | Crorey | |
| 6,170,732 B1 | 1/2001 | Vogt et al. | |
| 6,193,142 B1 | 2/2001 | Segawa et al. | |
| 6,250,533 B1 | 6/2001 | Otterbein et al. | |
| 6,253,504 B1 | 7/2001 | Cohen et al. | |
| 6,324,880 B1 | 12/2001 | Nakamura | |
| 6,325,435 B1 | 12/2001 | Dubuc | |
| 6,336,582 B1 | 1/2002 | Kato et al. | |
| 6,349,237 B1 | 2/2002 | Koren et al. | |
| 6,457,231 B1 | 10/2002 | Carter et al. | |
| 6,467,675 B1 | 10/2002 | Ozaku et al. | |
| 6,513,231 B1 | 2/2003 | Hafenrichter et al. | |
| 6,516,234 B2 | 2/2003 | Kamiguchi et al. | |
| 6,557,690 B2 | 5/2003 | Oldford et al. | |
| 6,564,440 B2 | 5/2003 | Oldford et al. | |
| 6,651,392 B2 | 11/2003 | Ritzal | |
| 6,688,048 B2 | 2/2004 | Staschik | |
| 6,705,001 B2 | 3/2004 | How et al. | |
| 6,705,523 B1 | 3/2004 | Stamm et al. | |
| 6,712,230 B2 | 3/2004 | Lopez Alba | |
| 6,719,122 B2 | 4/2004 | Oldford et al. | |
| 6,744,436 B1 | 6/2004 | Chirieleison, Jr. et al. | |
| 6,799,672 B2 | 10/2004 | Wood | |
| 6,799,673 B2 | 10/2004 | Kilabarda | |
| 6,813,539 B2 | 11/2004 | Morimoto et al. | |
| 6,857,529 B2 | 2/2005 | Lopez Alba | |
| 6,916,375 B2 | 7/2005 | Molnar et al. | |
| 6,948,227 B2 | 9/2005 | Kilibarda et al. | |
| 6,966,427 B2 | 11/2005 | Kilibarda | |
| 6,990,715 B2 | 1/2006 | Liu et al. | |
| 6,991,064 B2 | 1/2006 | Ehrenleitner | |
| 7,108,189 B2 | 9/2006 | Kilibarda | |
| 7,232,027 B2 | 6/2007 | Kilibarda | |
| 7,331,439 B2 | 2/2008 | Degain et al. | |
| 7,356,378 B1 | 4/2008 | Huang et al. | |
| 7,357,376 B2 * | 4/2008 | Assmann | B66C 13/06 254/337 |
| 7,490,710 B1 | 2/2009 | Weskamp et al. | |
| 7,546,942 B2 | 6/2009 | Monti et al. | |
| 7,845,121 B2 | 12/2010 | Wobben | |
| 8,097,451 B2 | 1/2012 | Gaalswyk | |
| 8,127,687 B2 | 3/2012 | Spangler et al. | |
| 8,201,723 B2 | 6/2012 | Kilibarda | |
| 8,308,048 B2 | 11/2012 | Kilibarda | |
| 8,360,225 B2 | 1/2013 | Spangler et al. | |
| 8,474,132 B2 | 7/2013 | Li et al. | |
| 8,474,683 B2 | 7/2013 | Kilibarda | |
| 8,561,780 B2 | 10/2013 | Albeck et al. | |
| 8,713,780 B2 | 5/2014 | Kilibarda | |
| 8,733,617 B2 | 5/2014 | Kilibarda | |
| 8,789,269 B2 | 7/2014 | Kilibarda et al. | |
| 8,869,370 B2 | 10/2014 | Kilibarda | |
| 9,513,625 B2 | 12/2016 | Kilibarda | |
| 9,802,766 B2 | 10/2017 | Ookada et al. | |
| 10,384,873 B2 * | 8/2019 | Kilibarda | B65G 17/20 |
| 2002/0087226 A1 | 7/2002 | Boudreau | |
| 2002/0103569 A1 | 8/2002 | Mazur | |
| 2002/0129566 A1 | 9/2002 | Piccolo et al. | |
| 2002/0135116 A1 | 9/2002 | Dugas et al. | |
| 2002/0162209 A1 | 11/2002 | Hosono et al. | |
| 2002/0166842 A1 | 11/2002 | Grebenisan | |

(56) References Cited

U.S. PATENT DOCUMENTS

| | | |
|---|---|---|
| 2003/0037432 A1 | 2/2003 | McNamara |
| 2003/0057256 A1 | 3/2003 | Nakamura et al. |
| 2003/0085192 A1 | 5/2003 | Lopez Alba |
| 2003/0115746 A1 | 6/2003 | Saito et al. |
| 2003/0175429 A1 | 9/2003 | Molnar et al. |
| 2003/0188952 A1 | 10/2003 | Oldford et al. |
| 2003/0189085 A1 | 10/2003 | Kilibarda et al. |
| 2004/0002788 A1 | 1/2004 | Morimoto et al. |
| 2004/0020974 A1 | 2/2004 | Becker et al. |
| 2004/0055129 A1 | 3/2004 | Ghuman |
| 2004/0149692 A1 | 8/2004 | Masanori |
| 2004/0216983 A1 | 11/2004 | Oldford et al. |
| 2004/0221438 A1 | 11/2004 | Savoy et al. |
| 2004/0258513 A1 | 12/2004 | Cooke |
| 2005/0008469 A1 | 1/2005 | Jung |
| 2005/0025612 A1 | 2/2005 | Ehrenleitner |
| 2005/0035175 A1 | 2/2005 | Nakamura et al. |
| 2005/0044700 A1 | 3/2005 | Ghuman et al. |
| 2005/0120536 A1 | 6/2005 | Kilibarda et al. |
| 2005/0153075 A1 | 7/2005 | Molnar et al. |
| 2005/0189399 A1 | 9/2005 | Kilibarda |
| 2005/0230374 A1 | 10/2005 | Rapp et al. |
| 2005/0236461 A1 | 10/2005 | Kilibarda et al. |
| 2005/0269382 A1 | 12/2005 | Caputo et al. |
| 2006/0157533 A1 | 7/2006 | Onoue et al. |
| 2006/0231371 A1 | 10/2006 | Moliere et al. |
| 2006/0288577 A1 | 12/2006 | Bormuth |
| 2007/0087924 A1 | 4/2007 | Krosta et al. |
| 2007/0164009 A1 | 7/2007 | Hesse |
| 2007/0175869 A1 | 8/2007 | Auger et al. |
| 2007/0215579 A1 | 9/2007 | Auger |
| 2007/0258797 A1 | 11/2007 | Gordon et al. |
| 2008/0022609 A1 | 1/2008 | Franco et al. |
| 2008/0061110 A1 | 3/2008 | Monti et al. |
| 2008/0084013 A1 | 4/2008 | Kilibarda |
| 2008/0104815 A1 | 5/2008 | Kussmaul |
| 2008/0105733 A1 | 5/2008 | Monti et al. |
| 2008/0116247 A1 | 5/2008 | Kilibarda |
| 2008/0131255 A1 | 6/2008 | Hessler et al. |
| 2008/0148546 A1 | 6/2008 | Monti et al. |
| 2008/0178537 A1 | 7/2008 | Spangler et al. |
| 2008/0181753 A1 | 7/2008 | Bastian et al. |
| 2008/0223692 A1 | 9/2008 | Tanahashi |
| 2008/0295335 A1 | 12/2008 | Kilibarda et al. |
| 2009/0056116 A1 | 3/2009 | Presley et al. |
| 2009/0078741 A1 | 3/2009 | Sata et al. |
| 2009/0118858 A1 | 5/2009 | Wallace et al. |
| 2009/0234488 A1 | 9/2009 | Kilibarda |
| 2009/0277747 A1 | 11/2009 | Spangler et al. |
| 2009/0277748 A1 | 11/2009 | Spangler et al. |
| 2009/0277754 A1 | 11/2009 | Spangler et al. |
| 2009/0277755 A1 | 11/2009 | Spangler et al. |
| 2009/0279992 A1 | 11/2009 | Spangler et al. |
| 2009/0285666 A1 | 11/2009 | Kilibarda |
| 2009/0300998 A1 | 12/2009 | Ablett |
| 2010/0136883 A1 | 6/2010 | Call et al. |
| 2010/0180711 A1 | 7/2010 | Kilibarda et al. |
| 2010/0241260 A1 | 9/2010 | Kilibarda et al. |
| 2010/0301099 A1 | 12/2010 | Sata et al. |
| 2010/0326832 A1 | 12/2010 | Albeck et al. |
| 2011/0017132 A1 | 1/2011 | Robbin |
| 2011/0047788 A1 | 3/2011 | Immekus et al. |
| 2011/0047791 A1 | 3/2011 | Ferenczi et al. |
| 2011/0138601 A1 | 6/2011 | Kilibarda |
| 2011/0192007 A1 | 8/2011 | Kilibarda |
| 2011/0252719 A1 | 10/2011 | Wallance |
| 2012/0005968 A1 | 1/2012 | Patino |
| 2012/0222277 A1 | 9/2012 | Spangler et al. |
| 2012/0274000 A1 | 11/2012 | Gaiser |
| 2012/0304446 A1 | 12/2012 | Kilibarda |
| 2013/0026002 A1 | 1/2013 | Spangler |
| 2013/0035783 A1 | 2/2013 | Scheuerman et al. |
| 2013/0109291 A1 | 5/2013 | Holtz et al. |
| 2014/0217155 A1 | 8/2014 | Kilibarda |
| 2014/0224621 A1 | 8/2014 | Monti et al. |
| 2015/0128719 A1 | 5/2015 | Kilibarda |

FOREIGN PATENT DOCUMENTS

| | | |
|---|---|---|
| CA | 2659143 A1 | 4/2010 |
| CA | 2904751 A1 | 4/2010 |
| CA | 2904752 A1 | 4/2010 |
| CA | 2786113 A1 | 7/2011 |
| CN | 101579792 A | 11/2009 |
| CN | 101722421 A | 6/2010 |
| CN | 102706746 A | 10/2012 |
| CN | 103649857 A | 3/2014 |
| DE | 19806963 A1 | 10/1998 |
| DE | 20012052 U1 | 10/2000 |
| DE | 19940992 A1 | 3/2001 |
| DE | 102004057664 A1 | 6/2006 |
| DE | 102005062691 A1 | 7/2007 |
| DE | 202007005034 U1 | 8/2008 |
| EP | 201262 A1 | 11/1986 |
| EP | 0232999 A2 | 8/1987 |
| EP | 0261297 A1 | 3/1988 |
| EP | 0446518 A1 | 9/1991 |
| EP | 574779 A1 | 12/1993 |
| EP | 1298043 A2 | 4/2003 |
| EP | 1302415 A1 | 4/2003 |
| EP | 1362663 A2 | 11/2003 |
| EP | 1403176 A2 | 3/2004 |
| EP | 1426275 A1 | 6/2004 |
| EP | 2100804 A1 | 9/2009 |
| EP | 2119532 A1 | 11/2009 |
| EP | 2332689 A1 | 6/2011 |
| EP | 2505299 A1 | 10/2012 |
| EP | 2585656 A2 | 5/2013 |
| EP | 2715465 A1 | 4/2014 |
| GB | 2250723 A | 6/1992 |
| GB | 2271651 A | 4/1994 |
| JP | S6340683 A | 2/1988 |
| JP | H0740059 A | 2/1995 |
| JP | 10101222 | 4/1998 |
| JP | H11104848 A | 4/1999 |
| JP | 2005205431 A | 8/2005 |
| JP | 2011121089 A | 6/2011 |
| WO | 8603153 A1 | 6/1986 |
| WO | 0068117 A1 | 11/2000 |
| WO | 2006109246 A1 | 10/2006 |
| WO | 2007077056 A1 | 7/2007 |
| WO | 2011085175 A2 | 7/2011 |
| WO | 2011162930 A1 | 12/2011 |
| WO | 2012166775 A1 | 12/2012 |

OTHER PUBLICATIONS

International Search Report and Written Opinion of the International Searching Authority dated Oct. 9, 2012 from the corresponding International Application No. PCT/US2012/039952.

International Search Report and Written Opinion of the International Searching Authority dated Aug. 29, 2011 from the corresponding International Application No. PCT/US2011/039097.

FMC; Automated Fork lifts and Material Handling Lifts—Forked Automated Guided Vehicles; http://www.fmcsgvs.com/content/products/forked.sub.—vehicles.htm;p. 1., printed Mar. 26, 2008.

FMC; SGV (Self Guided Vehicles)—Automated Guided Vehicle Systems; http://www.fmcsgvs.com/content/products/sgv.htm, p. 1, printed Mar. 26, 2008.

FMC; Automated Material Handling Systems & Equipment for Material Movement: AGV Applications; http://www.fmcsgvs.com/content/sales/applications.htm; pp. 1-2., printed Mar. 26, 2008.

FMC; Layout Wizard AGV Configuration Software; http://fmcsgvs.com/content/products/wizard.htm; p. 1., printed Mar. 26, 2008.

FMC; Laser Navigation Controls; http://www.fmcsgvs.com/content/products/nav.htm; pp. 1-2., printed Mar. 26, 2008.

European Search Report dated Jul. 13, 2009 from the corresponding European Application No. 09151980.1-1523.

FMC; AGV System Controls; http://www.fmcsgvs.com/content/products/system.htm; p. 1., printed Mar. 26, 2008.

(56) References Cited

OTHER PUBLICATIONS

European Search Report dated Apr. 19, 2011 from the corresponding European Patent Application No. 11152656.2-2302.
European Search Report dated Aug. 28, 2009 from the corresponding European Patent Application No. 09158794.9-2302.
Mats Jackson and Abedullah Zaman, Factory-In-a-Box-Mobile Production Capacity of Demand, International Journal of Modern Engineering vol. 8, No. 1 Fall2007.
Notification of Transmittal, the International Search Report and the Written Opinion of the International Searching Authority dated Jan. 28, 2013, from the corresponding International Application No. PCT/US2011/020486 filed Jan. 7, 2011.
International Search Report in related matter PCT/US2015/065588, dated May 19, 2016, 25 pages.

\* cited by examiner

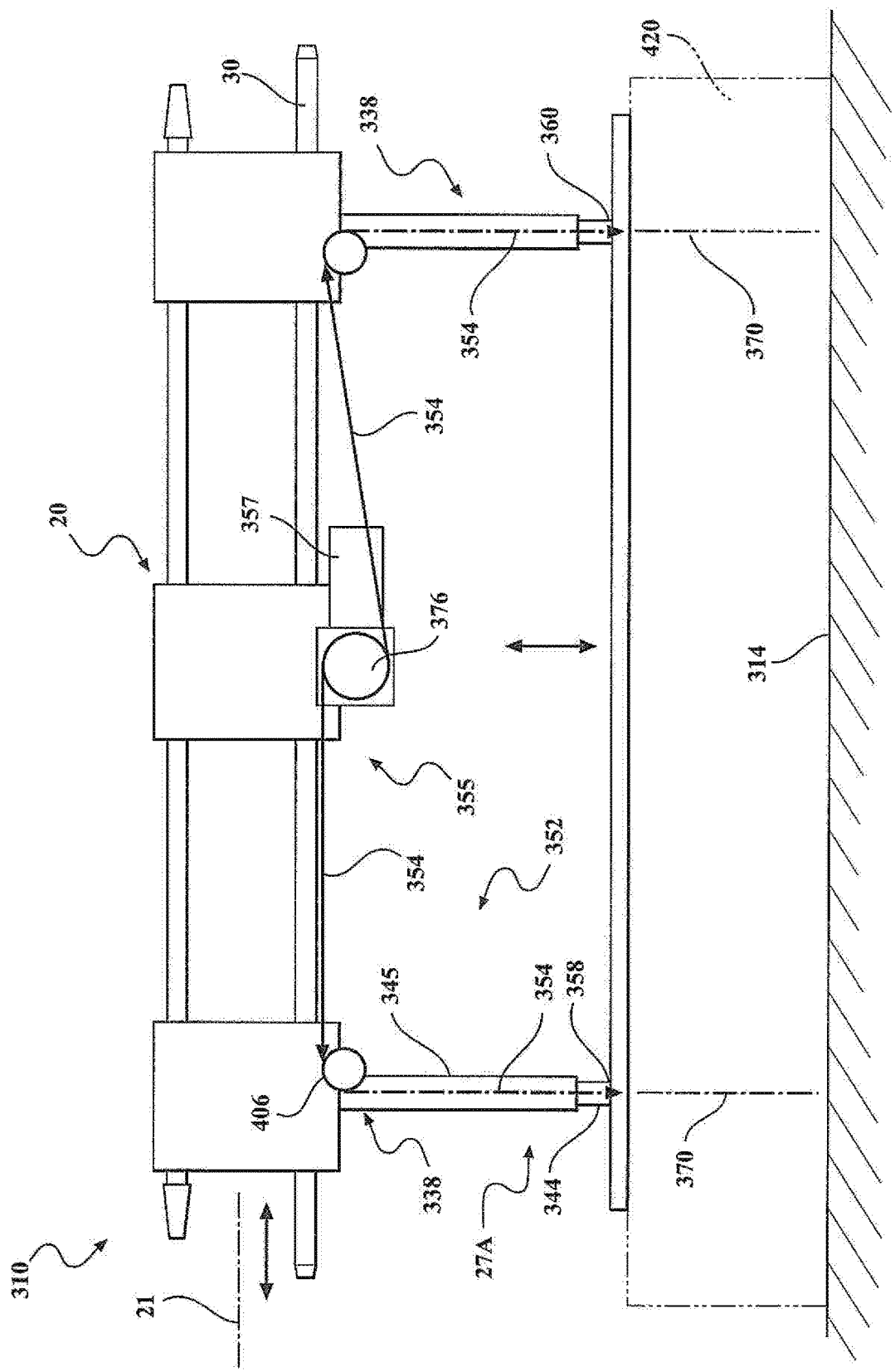

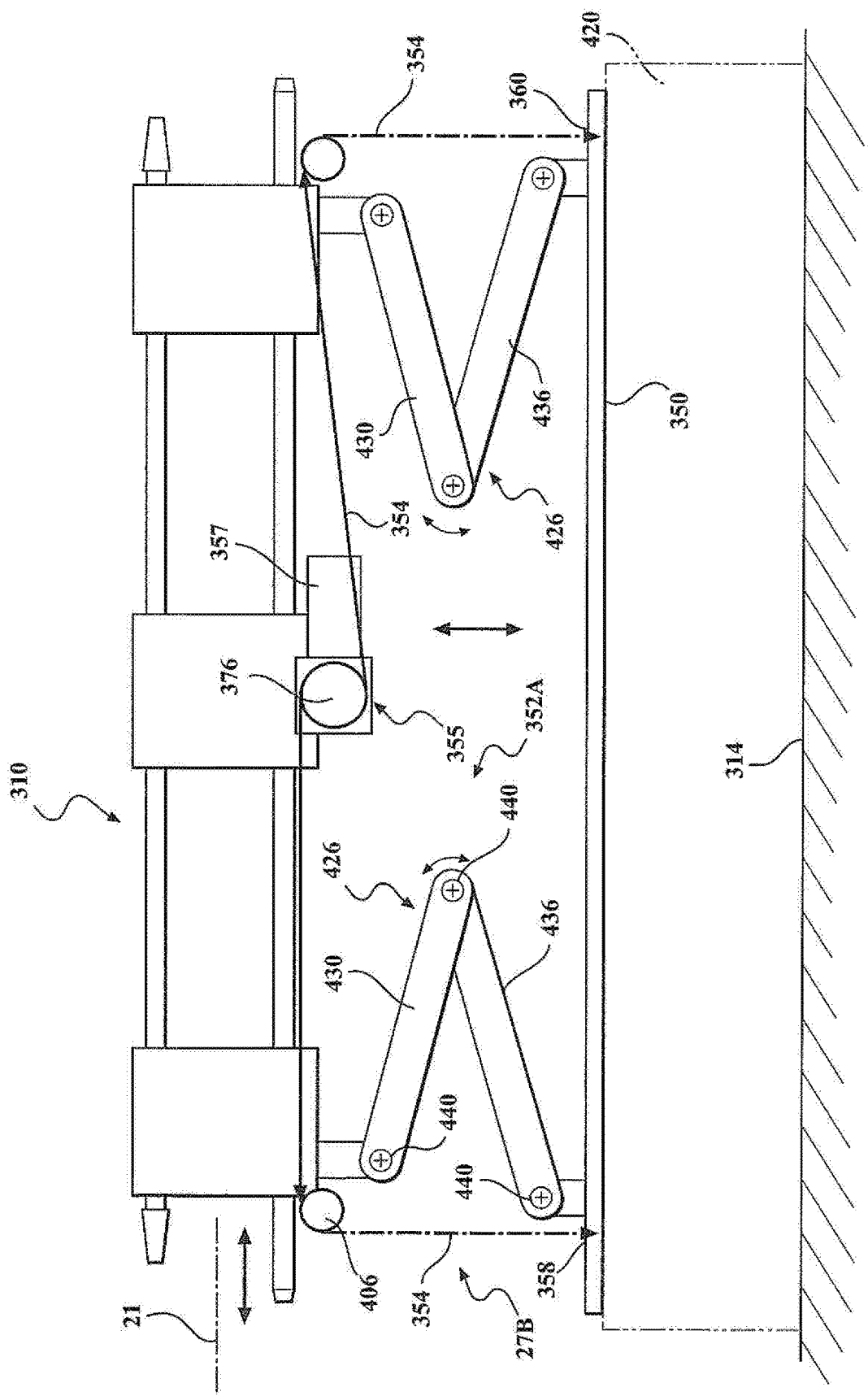

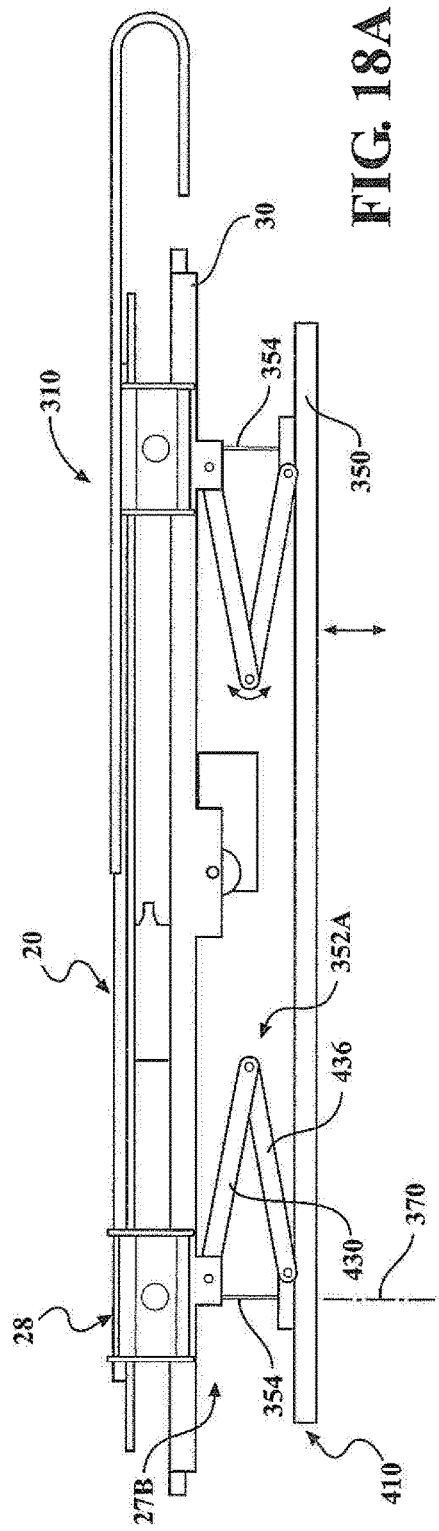
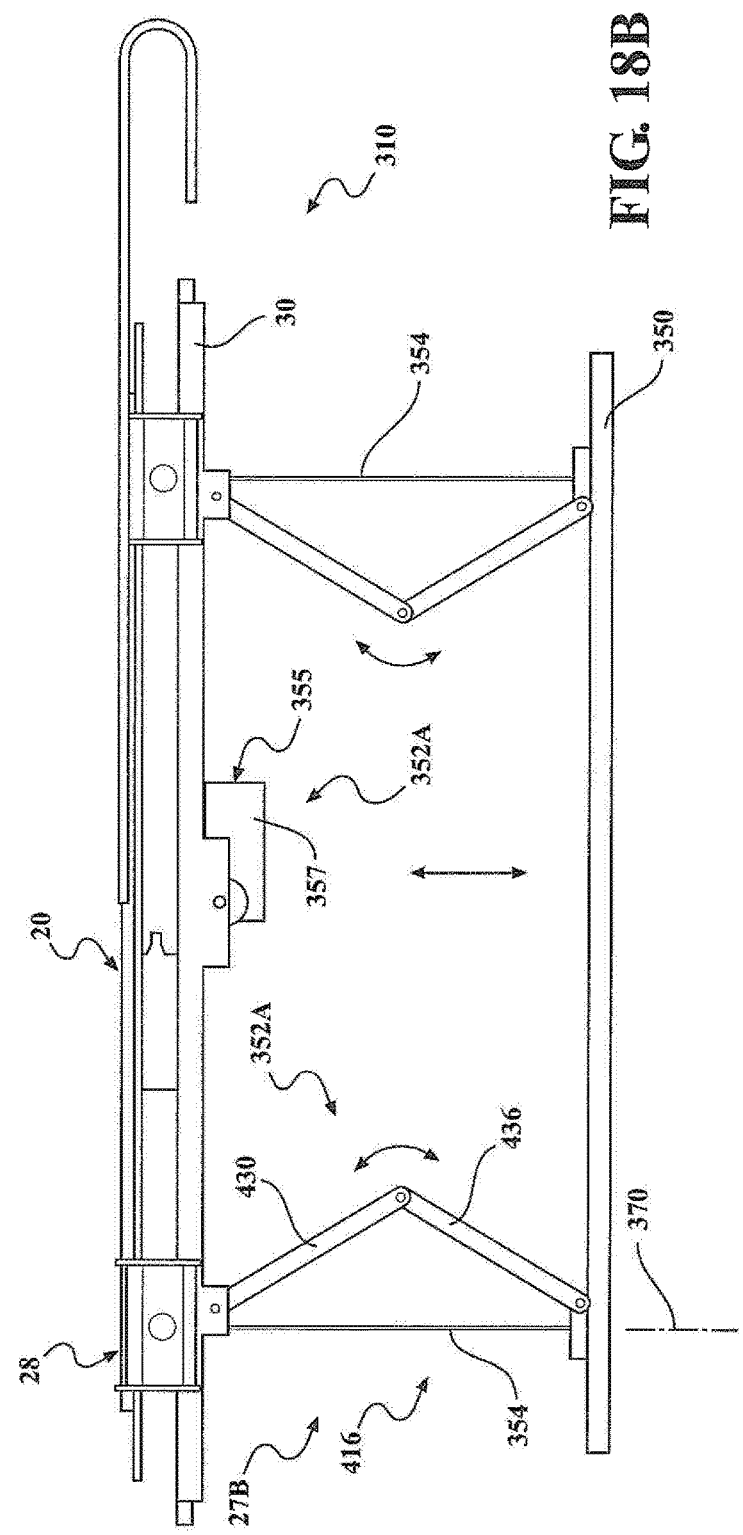

INVERTED CARRIER LIFT DEVICE SYSTEM AND METHOD

CROSS-REFERENCE TO RELATED APPLICATIONS

The present application is a divisional application of U.S. patent application Ser. No. 15/588,326 filed May 5, 2017 which claims priority benefit to U.S. Provisional Application No. 62/332,598, filed May 6, 2016, and U.S. Provisional Application 62/433,405, filed Dec. 13, 2016, the entire contents of each application are incorporated herein by reference.

TECHNICAL FIELD

The present invention pertains generally to assembly systems, particularly of the type including conveyors defining a path of travel between workstations for conveying of a workpiece to one or more workstations positioned along the path of travel.

BACKGROUND

In automotive production lines, individual workpieces, such as automotive body panels, frame components, etc., may be transported between workstations where selected operations, such as welding or other joining operations, are performed by workers, robots, or other processing equipment. Transporting individual workpieces to, and accurately placing the workpieces at, a desired workstation on a production line poses numerous difficulties. Tooling and other processing equipment at a workstation present obstacles that must be avoided by the incoming and departing workpieces. After reaching a given workstation, the workpieces must be accurately positioned within the workstation to allow necessary processing operations to be performed. Efficiency and accuracy requirements of modern production lines require that workpiece delivery to a workstation be as rapid and precise as possible.

In many common production lines and other assembly applications, workpieces are transported along an overhead rail, for instance a monorail. Powered roller rail systems move support trolleys or carriages between various workstations. Electrical conductors can be provided along the rail to provide power to the trolley motors. The trolleys carry workpieces along the path defined by the rail, delivering the workpieces to the workstations. To perform a processing operation on a workpiece transported along an overhead rail, often a mechanism must be provided to raise and lower the workpiece with respect to the workstation to properly position the workpiece in the workstation. Prior powered roller rail and trolley systems and devices used to raise and lower workpieces in a workstation include those described in U.S. Pat. Nos. 6,799,673; 9,513,625; and U.S. Patent Application Publication No. 2015/0128719 assigned to the assignee of the present invention and all incorporated herein by reference.

Many prior known mechanisms for raising and lowering a workpiece into the workstation have moved the entire workpiece-laden trolley along with an entire section of the overhead rail. This type of mechanism is complicated in design and prone to wear. For example, joints must be provided between the fixed and moveable rail sections to disengage and re-engage the rail and/or trolley to the main conveyor mechanism. It can be difficult to ensure that the section of rail lowered with the trolley is properly realigned with the fixed rail sections. This negatively impacts the operational capacity of the production or assembly lines, for instance by causing wasteful "down-time" for repairs. In addition to the foregoing disadvantages, many prior known mechanisms cycle at relatively slow speeds, since the weight of the carrier, trolley, and rail must all be borne by the movement mechanism. Consequently, a need exists for a simplified lifting mechanism that meets the efficiency requirements of modern production and assembly lines, and which is simple in operation.

SUMMARY

The inventive inverted carrier lift device system and method is useful to transport a workpiece along an assembly line and to selectively lower and raise the workpiece in a predetermined area for processing or temporary storage of the workpiece. The carrier lift may selectively and automatically release the workpiece into a fixture or other device for processing and thereafter automatically re-engage the workpiece for continued movement along the assembly line.

In one example, the carrier includes an onboard lifting mechanism having a ratcheting device and a tether for raising and lowering a support beam engaged with the workpiece through workpiece engaging devices. The lifting mechanism is selectively engageable with a motor stationarily positioned at a workstation which rotates the ratchet device to raise and lower the workpiece. In a lowered position, the workpiece engaging devices are automatically actuated to release the workpiece from the support beam into a desired holding fixture or other device for further processing or storage. Following further processing or storage of the workpiece in the workstation, the carrier is positioned, lowered and automatically re-engaged with the workpiece. The carrier is then raised by the lifting mechanism and selectively moved along the assembly line to another predetermined position.

In one example, the ratchet device includes a drum which threadingly engages a single tether connected at both ends to the workpiece support beam, on rotation of the ratchet device by the motor, the tether is spooled onto, or unspooled from, the drum to raise or lower the workpiece respectively.

In another example, the carrier is connected to a trolley engaged with and elevated or overhead conveyor for movement of the carrier along an assembly line through a plurality of workstations.

In another example, the carrier is used with a trunnion fixture positioned in a workstation along the assembly line. At a lowered position, the carrier positions and releases the workpiece to the trunnion fixture which rotatably manipulates the workpiece to one or more predetermined positions for processing of the workpiece.

The inventive method for raising and lowering a workpiece in a workstation is useful for selectively vertically positioning a workpiece in a workstation for processing or temporary storage of the workpiece in the workstation or other location. In one example, a carrier is connected to a trolley engaged with an elevated or overhead carrier movable along an assembly line. The carrier selectively raises or lowers the supported workpiece relative to the trolley to position the workpiece on a fixture or other device positioned in the workstation.

In one example of the method, the carrier automatically releases the workpiece into the fixture or other device and then re-engages the workpiece following processing or storage for further movement along the assembly line.

In another example an alternate lift mechanism including an extension device using scissor links is used to raise and lower the workpiece.

In another example, the actuating motor for selectively raising and lowering the workpiece is onboard the lift carrier instead of stationarily positioned at the workstation independent of the carrier.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views, and wherein:

FIG. 16 is a side view of an example of the flexible elevated transport carrier;

FIG. 17 is a side view of an alternate example of a flexible elevated transport carrier;

FIG. 18A is an alternate side view of the example the flexible elevated transport carrier of FIG. 3 shown in a raised position;

FIG. 18B is an alternate side view of the example of a flexible elevated transport carrier of FIG. 3 shown in a lowered position;

DETAILED DESCRIPTION

Referring to FIGS. 1-4, an example of an inverted carrier lift 10 used with an elevated or overhead conveyor system 20 is shown. The overhead conveyor 20 may include an elevated or overhead support frame (not shown) of any configuration suitable for supporting loads to be transported along a path of travel 21. The support frame structure may include a programmable powered roller mechanism which is operable to selectively move the inverted carrier lift 10 along the path of travel 21 through a plurality of workstations. Suitable frames or support structures are disclosed in U.S. Pat. Nos. 6,799,673; 8,201,723 and/or 9,513,625.

Figure 2:
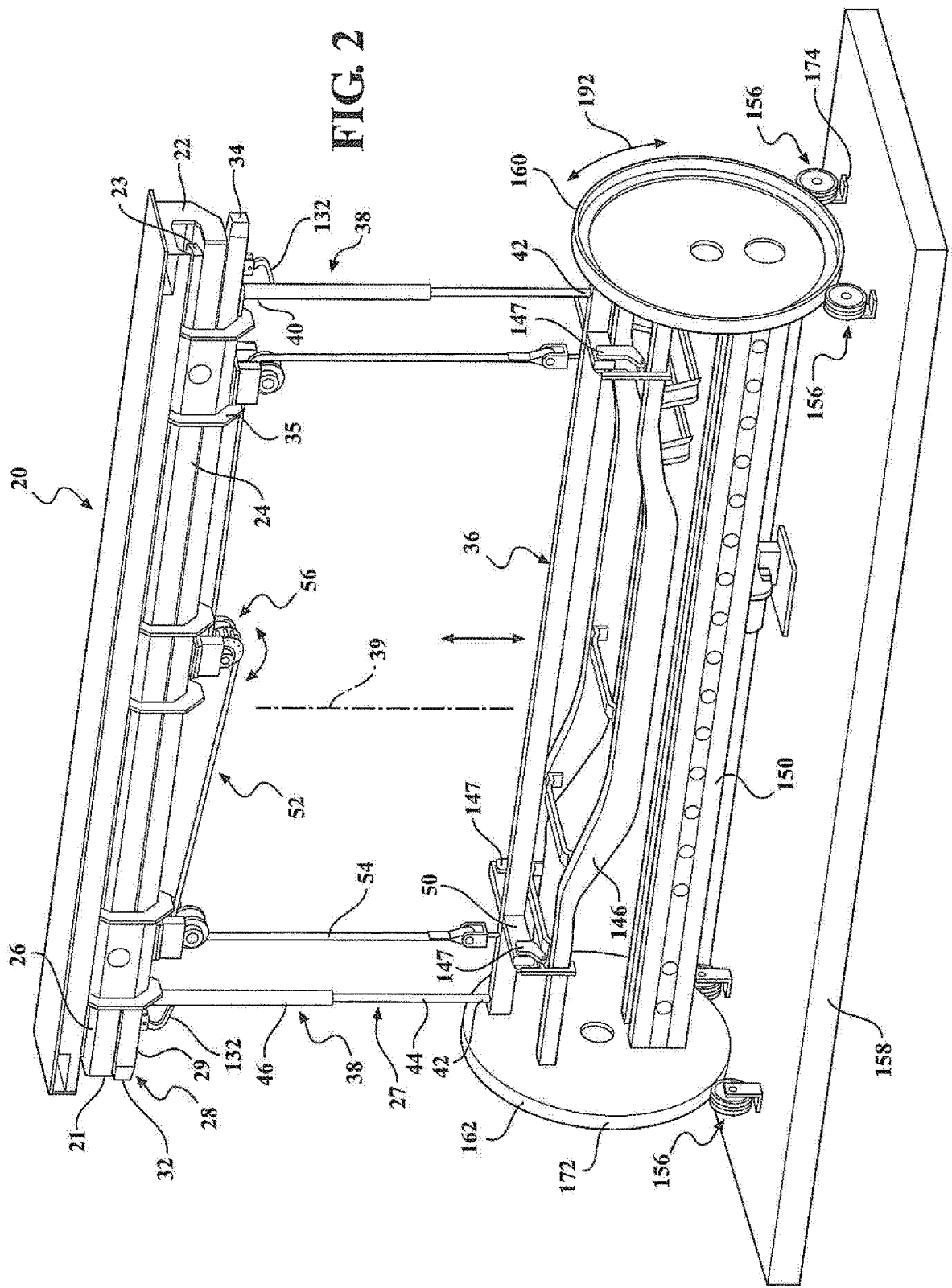
FIG. 2 is a rear perspective view of the overhead conveyor system in FIG. 1.

As best seen in FIG. 2, the support frame includes brackets 22 that support an elongated guide rail 24 which serves to support the inverted carrier lift 10 and defines the path of travel 21 for the overhead conveyor 10. A plurality of powered rollers 26 (see FIG. 2) may be rotatably mounted to the guide rail 24 in fixed locations spaced along the path of travel 21. One or more motors (not shown) may be employed to rotatably drive at least a portion of the rollers 26. At least some of the rollers 26 may be operably associated with one another to rotate substantially in unison. A suitable powered roller overhead transport system is described in U.S. Pat. No. 6,799,673.

The powered rollers 26 may be controlled by a programmable control system used to monitor, sequence and control the movement of the individual inverted carrier lift trolleys discussed below along an assembly line. One example of a suitable control system is described in U.S. Patent Application Publication No. US 2010/0241260 assigned to the assignee of the present invention and incorporated by reference herein.

The inverted carrier lift 10 may be selectively and precisely positioned at one or more locations in a workstation through a closed loop control system including an optical reader positioned at the station and coded strips or other devices on the carrier 27. The coded strips may be specific to the particular carrier lift 27 or the workpiece transferred by the carrier 27 such that on a carrier 27 entering a workstation, the optical reader scans the coded strip identifying information on the strip, which may be particular to the specific carrier 27, and the carrier 27 can be stopped at a predetermined or optimal position in the workstation for the work to be performed on the workpiece. One suitable transport monitoring, control and positioning system is disclosed in U.S. Pat. No. 7,108,189 owned by the assignee of the present invention and is incorporated herein by reference. An example of the coded strip is shown atop rail 23 in FIG. 26. Other frame supports, overhead carrier transport devices, and monitoring, control and positioning systems known by those skilled in the art, may be used. While the exemplary overhead conveyor system 20 is configured as a single monorail overhead system, other configurations of overhead conveyor systems may be employed, including but not limited to multi-rail systems.

As best seen in FIG. 2, the exemplary inverted carrier lift system 10 includes a carrier 27 connected to a trolley 28 supported by the overhead conveyor system 20. In the example, trolley 28 includes an elongate support member 30 including a first end 32 and a second end 34. Two or more c-shaped arms 35 (three shown) rigidly connect the support member 30 to the support rail 23 which, by weight of gravity, frictionally engages the rollers 26 for movement along the guide rail 24 in response to rotation of the powered rollers 26. The trolley 28 is moveable along the guide rail 24 and is selectively controllable to selectively stop at one or more workstations or assembly cells located along the path of the conveyor system 20 as previously described above. The c-shaped arms 35 may be of other constructions, figurations and orientations. Other devices and methods for supporting trolley 28 on a powered overhead conveyor system, and moving the trolley 28 from workstation to workstation, known by those skilled in the art may be used.

Figure 1:
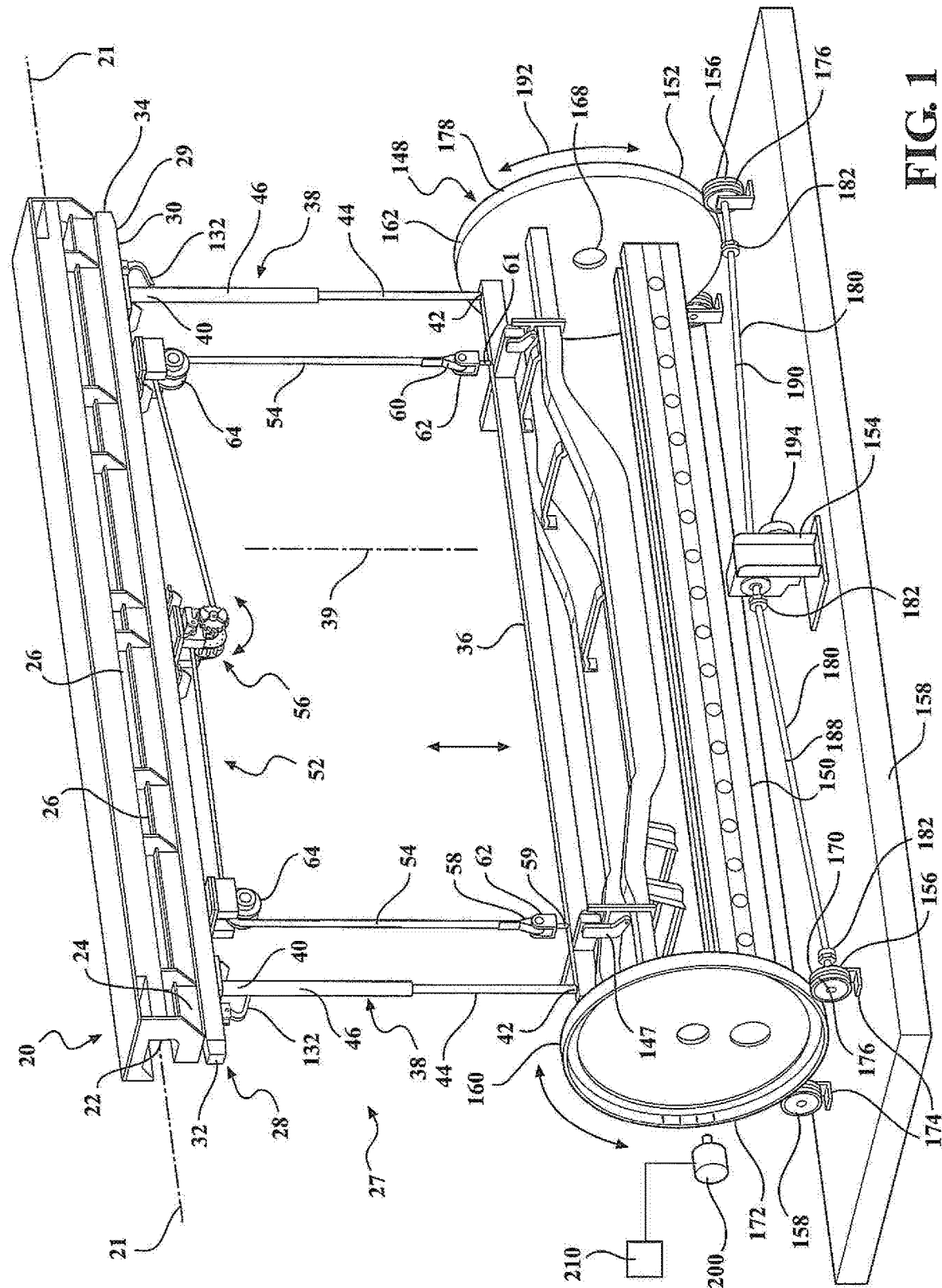
FIG. 1 is a front perspective view of an inverted carrier lift system used with an overhead conveyor system.
Figure 3:
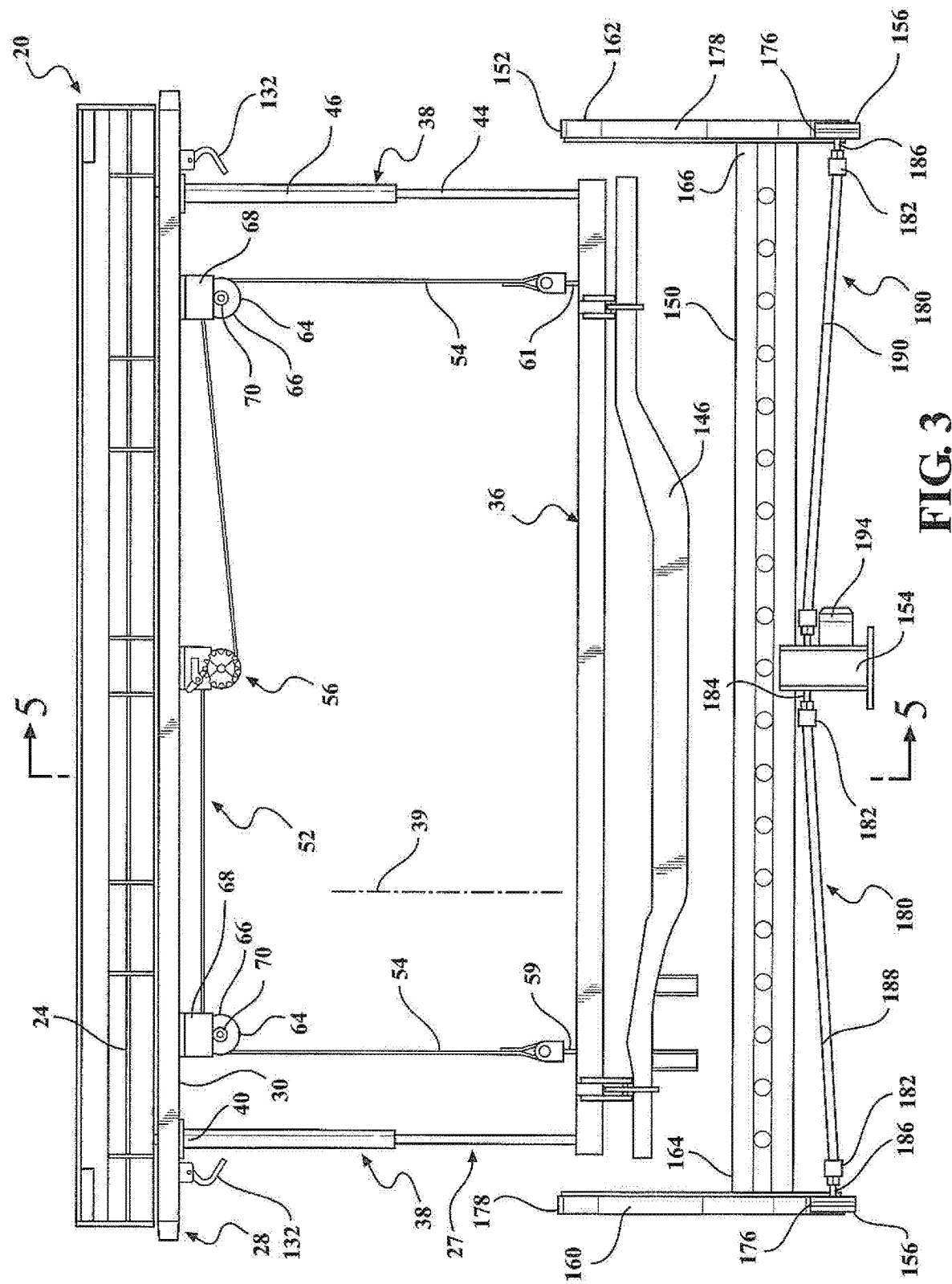
FIG. 3 is a front view of the overhead conveyor system in FIG. 1 with a carrier arranged in a lowered position.
Figure 4:
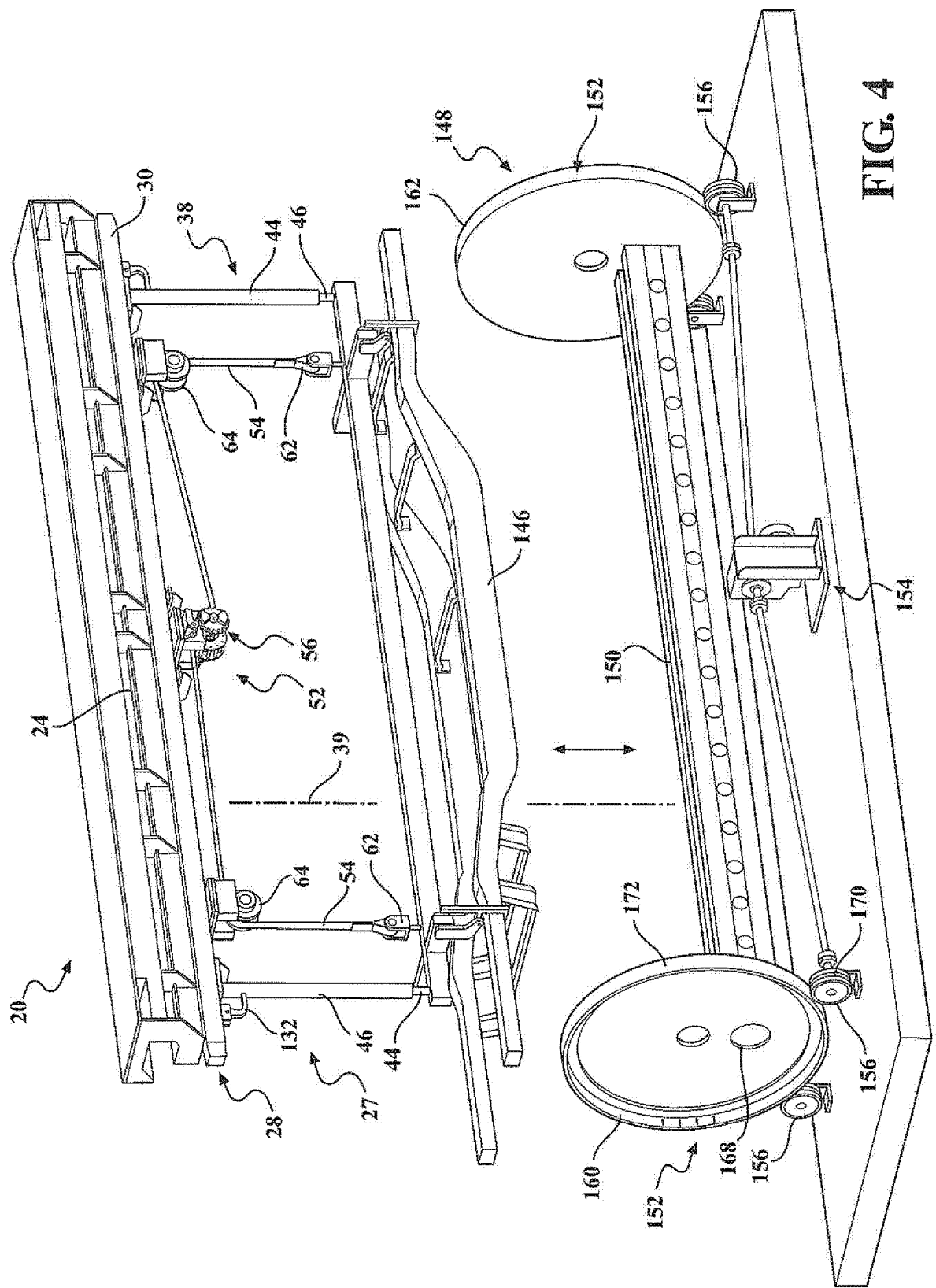
FIG. 4 is a front perspective view of the overhead conveyor system in FIG. 1 with the carrier arranged in a raised position.
Figure 5:
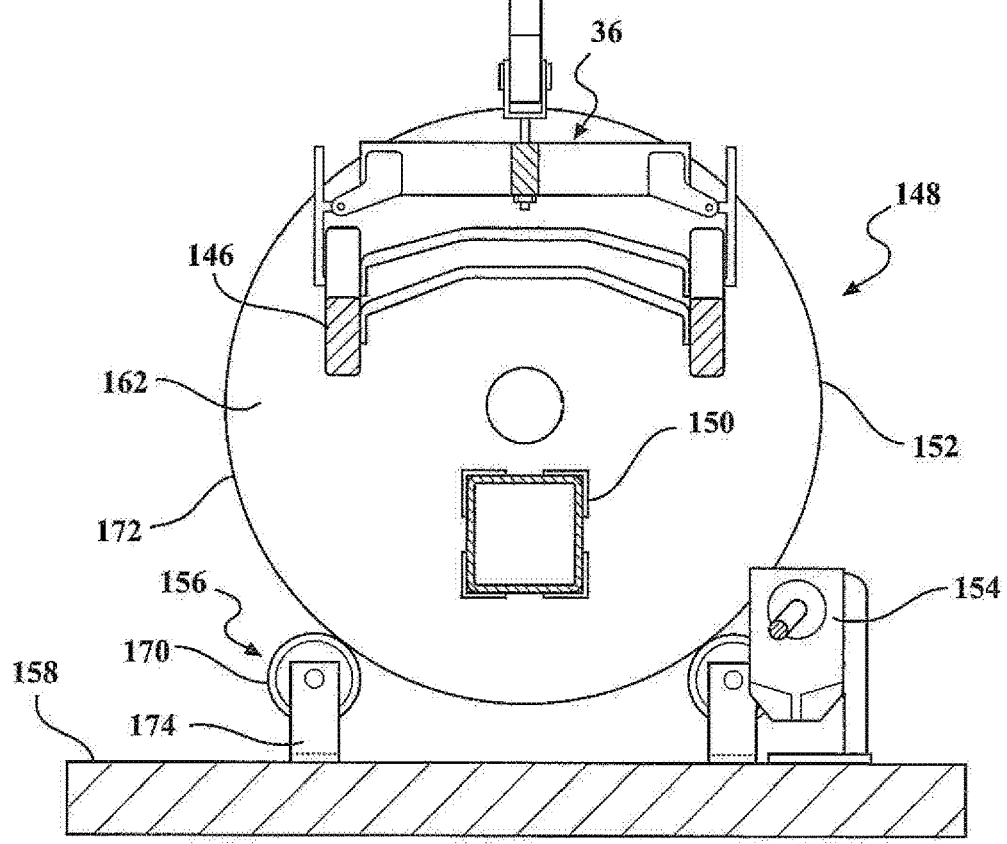
FIG. 5 is a partial cross-sectional view of the overhead conveyor system taken along section line 5-5 of FIG. 3.

The exemplary inverted carrier 27 includes a workpiece support beam 36 suspended from the trolley 28 by two telescopic posts 38. The workpiece support beam 36 is selectively movable between a raised position, for example, as shown in FIG. 4, and a lowered position, for example, as shown in FIGS. 1-3 along a carrier path of travel. An upper end 40 of each telescoping post 38 is attached to the trolley 28 support member 30 and a lower end 42 is attached to the carrier 36. The telescopic posts 38 are operable guide the raising and lowering of the workpiece support beam 36 and to restrict lateral movement of the workpiece support beam 36 when moving between the raised and lowered positions.

In the example, each telescopic post 38 includes a lower post member 44 slidably received within an upper post member 46. In the illustrated exemplary configuration, the upper post member 46 is shown attached to the trolley 28 and the lower post member 44 attached to the workpiece support beam 36, but in practice, the orientation of the telescoping post 38 may be inverted, such that the lower post member 44 is attached to the trolley 28 and the upper post member 46 is attached to the carrier 36. As illustrated, when operating the carrier 27, the lower post member 44 moves progressively further into the upper post member 46 when moving the workpiece support beam 36 toward the raised position, and extends progressively further out from the upper post member 46 when moving the workpiece support beam 36 toward the lowered position. The telescopic post 38 may include an alternate configuration to accommodate the design and performance requirements of a particular application. More than two telescopic posts 36 may be employed with the carrier 27.

Referring to the example carrier 27 shown in FIGS. 1 and 2, workpiece support beam 36 is shown as a generally horizontal support member extending between, and attached to, the two telescopic posts 38. Workpiece support beam 36 may further include one or more auxiliary arm supports 50 attached to and extending generally outward from the horizontal member 48. The workpiece support beam 36 may also support interchangeable antlers (vertical oriented fixtures or tooling posts, not shown) for carrying various configurations of workpieces (including subassemblies) between workstations for processing. Examples of the referenced antlers are disclosed in U.S. Pat. No. 6,557,690 the entire contents of which is incorporated by reference. The carrier 27 including workpiece beam support 36 may be moved from the raised transport position, for example raised up close to support member 30, to a lowered transfer position, for example as shown in FIGS. 1 and 2, when stopped at a predetermined position at the workstation as further described below. Alternate constructions, configurations and orientations of horizontal member 48, auxiliary arms 50 and telescopic posts 38 may be used to suit the workpiece being supported or the general assembly/process line application.

With reference to the example shown in FIGS. 1-4, the carrier lift system 10 includes a lifting mechanism 52 operable for selectively moving the carrier 27 including workpiece support beam 36 between the raised position and lowered position. The exemplary lifting mechanism 52 includes a flexible tether 54 attached to the workpiece support beam 36 and engaged with a ratchet mechanism 56. The ratchet mechanism 56 may be rotatably driven by a motor 57 (see FIG. 10) stationarily mounted at a workstation and further described below to cyclically retract and extend the tether 54 to raise and lower the workpiece support beam 36. The tether 54 may include various configurations and materials, for example, braided steel cable, woven nylon straps, reinforced belts, chains and other devices known by those skilled in the art In one example of the illustrated tether 54, tether 54 includes a single, continuous member that is threaded through the ratchet mechanism 56 further discussed below, and attached at both a first end 58 and a second end 60 to the carrier 36 at a first attachment point 59 and a second attachment point 61, respectively. A buckle 62 may be used to attach the ends 58 and 60 of the tether 54 to the carrier 36.

In the example shown, tether 54 passes through a pair of pulleys 64 attached to the support member 30 spaced on either side of the ratchet mechanism 56 as generally shown. As best seen in FIG. 3, the pulley 64 includes a pulley roller 66 rotatably mounted to a bracket 68 that may be attached to the guide rail 24. A shaft 70 may be used to rotatably connect the pulley roller 66 to the bracket 68.

The pair of pulleys 64 may be spaced apart along the guide rail 24 by a distance that approximates the spacing between the attachment points 59 and 61 of the tether 54 to workpiece support beam 36. To maximize lifting efficiency of the lifting mechanism 52, the pulleys 64 may be spaced such that portions of the tether 54 located between the pulleys 64 and the tether connection points 59 and 61 are arranged substantially parallel to one another. A different pulley 64 spacing may be employed, but may result in reduced lifting efficiency.

Figure 6:
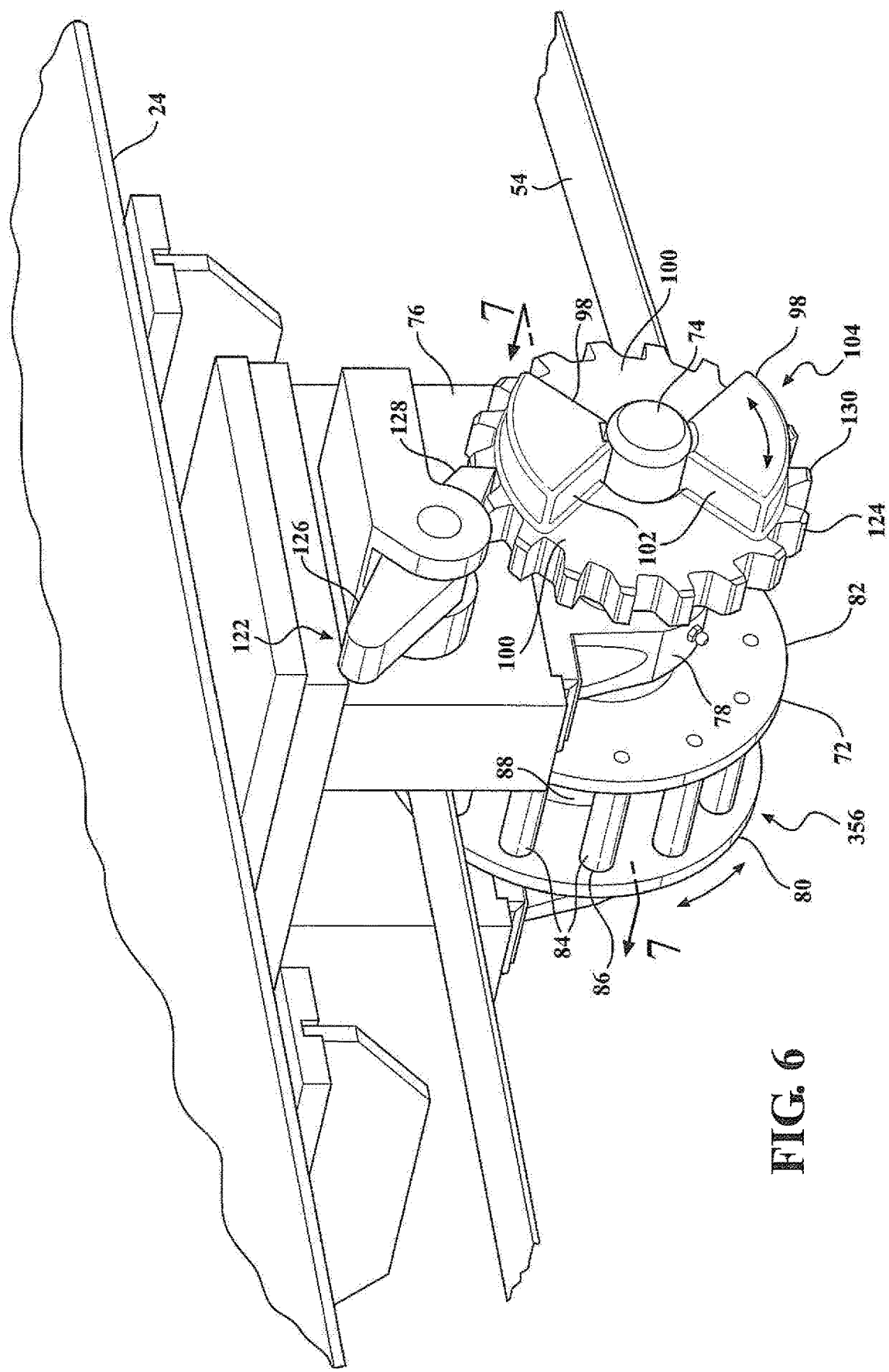
FIG. 6 is an enlarged perspective view of an exemplary ratchet mechanism used in the system shown in FIG. 1.
Figure 7:
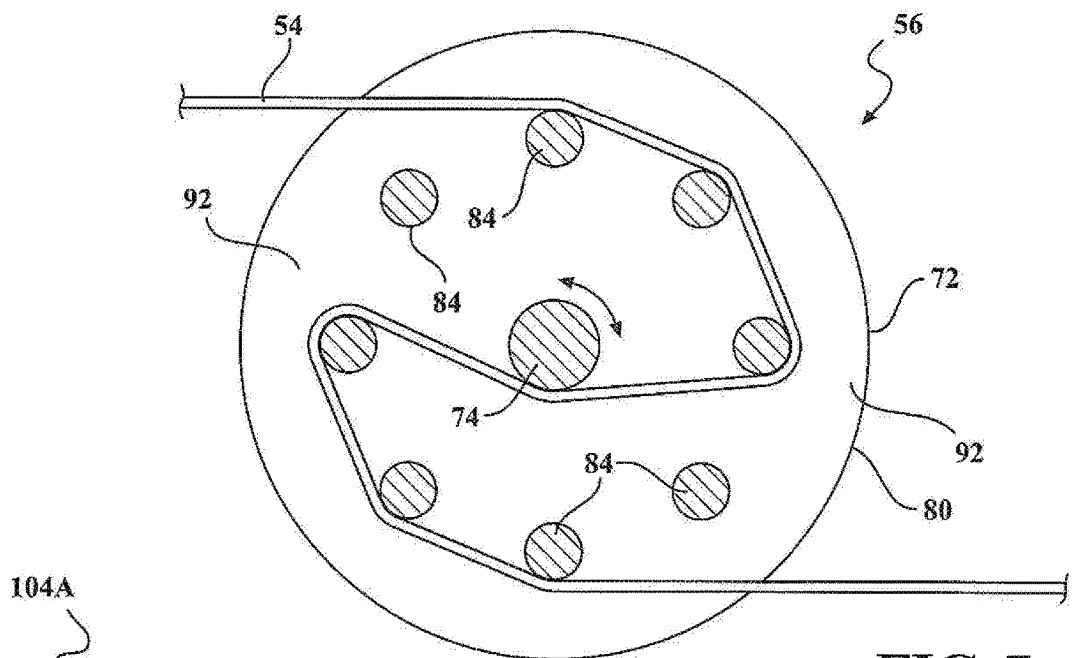
FIG. 7 is a partial cross-sectional view of the ratchet mechanism taken along section line 7-7 of FIG. 6 showing engagement with a tether.

Referring to FIGS. 6 and 7, the exemplary ratchet mechanism 56 is connected to the trolley 28 support member 30. The exemplary ratchet mechanism includes a rotatable drum 72 fixedly attached to a ratchet shaft 74. The ratchet shaft 74 is rotatably mounted to a ratchet housing 76 that attaches to the support member 30. To allow for generally free rotation of the drum 72 relative to the ratchet housing 76, the ratchet shaft 74 may be supported on one or more bearings (not shown) mounted within a bearing cup 78 attached to the ratchet housing 76.

In the example shown, the drum 72 includes a first drum end plate 80 and a second drum end plate 82. A plurality of elongate rods 84 extend between the first 80 and second 82 drum end plate, each rod with a first end 86 attached to the first drum end plate 80 and an opposite second end 88 attached to the second drum end plate 82. In one example, the rods 84 may be arranged generally perpendicular to the first 80 and second 82 drum end plates. The rods 84 may also be arranged in a circle so as to form linear segments generally defining an outer perimeter of a cylindrical-shaped structure extending between the first 80 and second 82 drum end plates. In the example best seen in FIG. 7, each rod 84 is equally radially spaced from, and equally angularly spaced, relative to ratchet shaft 74 as generally shown. Alternate constructions of drum 72 and rods 84 may be used. For example, more or less rods 84 may be used as well as the radial and angular position and spacing of the rods 84 relative to each other and ratchet shaft 74. Alternate devices for drum 72 may also be used to reel in/take-up or reel/let out the tether 54 to respectively raise or lower carrier 27.

As best seen in FIG. 7, reviewing from right to left, the tether 54 is oriented to frictionally engage several of the lower rods 84, pass angularly around a portion of the ratchet shaft 74, through one of a plurality of open spaces 92 formed by pairs of immediately adjacent rods 84, and then frictionally engage several of the other upper plurality of rods 84 before passing toward the adjacent pulley 64 as generally shown. In operation, rotating the drum 72 about a rotational axis of the ratchet shaft 74 causes the tether 54 to spool or reel on to, or off of, the generally cylindrical-shaped drum 72 thereby respectively raising or lowering the carrier 36. For example, using the tether 54 threaded through drum 72 as shown in FIG. 7, from the perspective illustrated in FIGS. 1 and 6, rotating the drum 72 in a clockwise direction will raise the carrier 27, and rotating the drum 72 counterclockwise will lower the carrier 27. Other orientations and engagement methods of tether 54 relative to drum 72 may be used to suit the particular application and desired movement of carrier 36 relative to support member 30.

Although lifting mechanism 52 is described and illustrated as including a single continuous tether 54 threaded through the ratchet mechanism 56, alternately, two or more tethers may be used in place of the single tether 54. For example (not shown), one tether may have a first end attached to the carrier 36 at the first attachment point 59 and a second end attached to one of the rods 84 of the ratchet mechanism 56 (or other reel or take-up device). Similarly, a second tether (not shown) may have a first end attached to the carrier 36 at the second attachment point 61 and a second end attached to one of the rods 84 of the ratchet mechanism 56 (or other reel or take-up device). The lifting mechanism 52 will operate in a similar manner to reel in or out a length of the tether(s) whether employing a single tether or multiple tethers.

Figure 10:
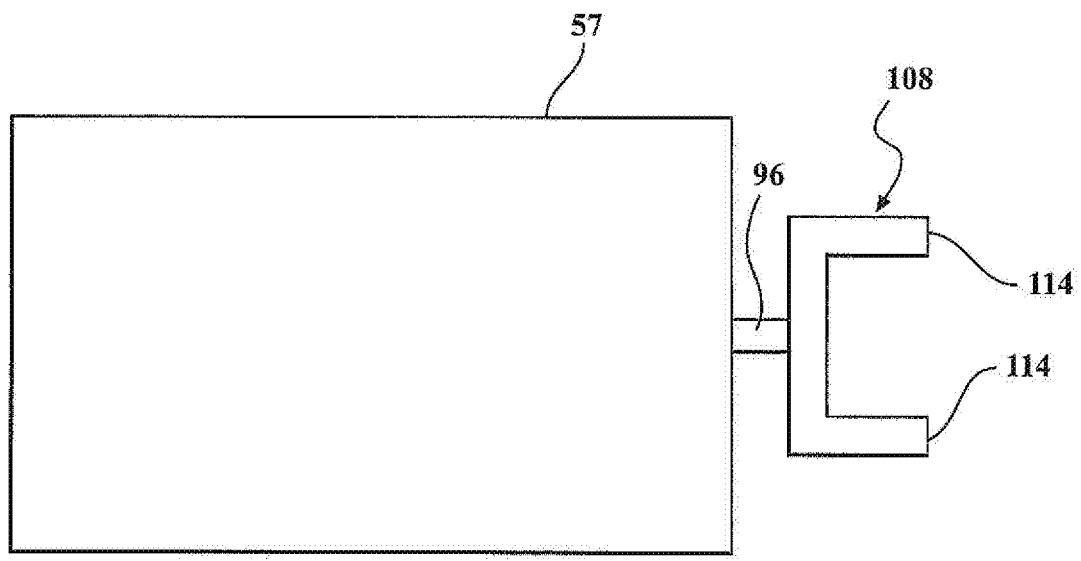
FIG. 10 is a side view of an exemplary drive motor that may be used to actuate the ratchet mechanism of FIG. 6.

Referring to FIG. 10, an example of a motor 57 is shown. The motor 57 is used to engage and selectively rotate ratcheting mechanism 56 to raise or lower carrier 27. In the example system 10, motor 57 is stationarily mounted in a workstation in a position coordinated with a predetermined stopping position for the carrier 27 and workpiece support beam 36. For example, when trolley 28 and connected carrier 27 enter a workstation and are brought to a stop at a predetermined position for proper alignment of the carrier 27 and the workpiece 146 for processing at that workstation, for example to be lowered to the trunnion fixture described further below, motor 57 is in alignment for engagement with the ratcheting mechanism 56 in a manner further described below, to raise or lower the carrier 27 as predetermined for that workstation and workpiece 146. In the examples illustrated herein, workpiece 146 is a passenger vehicle or truck frame. Other automotive components and subassemblies may serve as workpiece 146. It is understood that workpiece 146 may include other components and subassemblies other than automotive components.

Referring to FIG. 6, one example of a ratchet mechanism 56 ratchet coupler 104 is shown. Exemplary ratchet coupler 104 includes a pair of diametrically opposed lobes 98 extending radially outward from the ratchet shaft 74 as generally shown. In the example, each lobe 98 includes angularly offset contact surfaces 102 defining diametrically opposed radially-positioned openings 100 between the respective contact surfaces 102. Referring to FIG. 6, in one example of a motor coupler (not shown), the motor coupler is connected to motor 57 shaft 96 (FIG. 10), and includes complimentary lobe structures to abuttingly engage the ratchet coupler 104 such that on rotation of the motor shaft 96, the motor coupler engages the respective contact surfaces 102 thereby equally rotating the ratchet coupler 104 and the attached drum 72.

In one example of engagement of the above described motor coupler (not shown), the motor 57, the motor shaft 96 or other structure (not shown) is actively extended in a direction toward the ratchet coupler 104 to position the motor coupler lobes into the coordinating openings 100 in the ratchet coupler 104 such that rotation of the motor shaft 96 equally rotates the ratchet coupler 104 and drum 72. On completion of the processing at the workstation, the motor 57, coupler, shaft 96 or other device is retracted in a direction away from the ratchet coupler 104 to disengage the motor coupler lobes from the ratchet coupler openings 100 thereby clearing the motor coupler from the ratchet coupler 104 so the trolley can freely move from the workstation along the path of travel 21.

Figure 8:
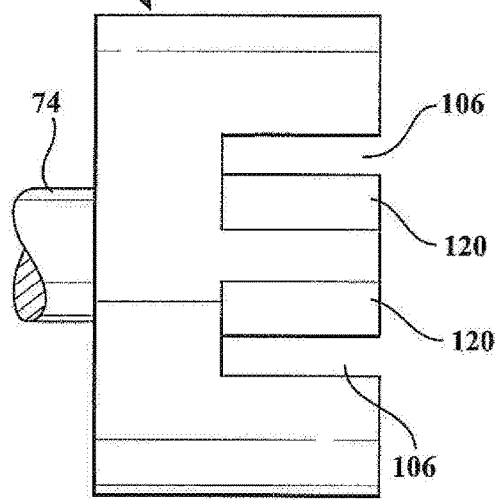
FIG. 8 is a front view of an example of a ratchet coupler that may be employed with the ratchet mechanism of FIG. 6.
Figure 9:
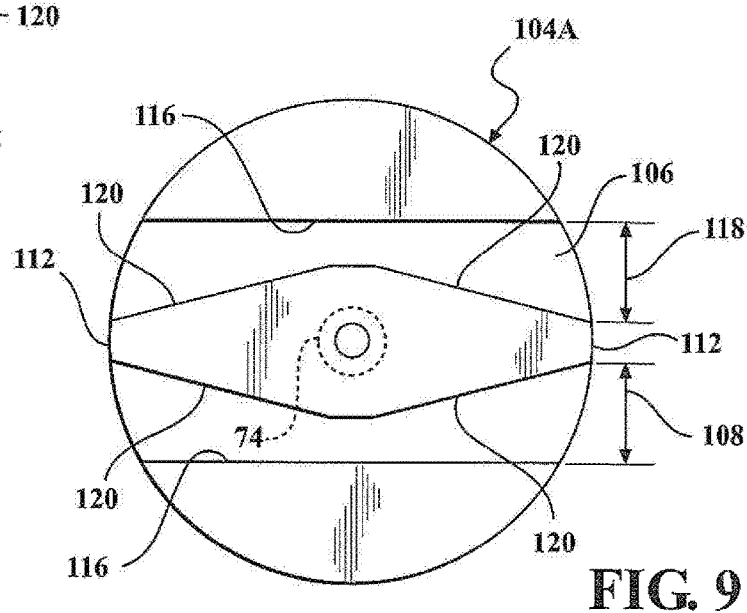
FIG. 9 is a side view of the ratchet coupler of FIG. 8.

Referring to FIGS. 8 and 9, an alternate example of a ratchet coupler 104A is shown. In the alternate example, ratchet coupler 104A is configured to include a slot 106 defined by walls 116 formed in an end face of the ratchet coupler 104A opposite the drum 72 so as to be accessible and engageable by the motor coupler 108 (FIG. 10). Generally centered within the slot 106 is a trapezoidal-shaped cam 110 having sides 120. The cam 110 is arranged relative to the slot 106 such that a line interconnecting two opposite vertices 112 of the trapezoidal-shaped cam 110 is aligned generally parallel to a longitudinal axis of the slot 106.

As best seen in FIG. 10, an alternate motor coupler 108 includes a pair of planar plates 114 spaced for coordinating position between the respective wall 116 of the slot 106 and the cam 110 when the ratchet coupler 104A engages the motor coupler 108 as described below. The example motor coupler 108 is engaged with the ratchet coupler 104 by horizontally sliding each of the plates 114 of the motor coupler 108 through a respective opening 118 formed in the ratchet coupler 104A between the side walls 116 and the cam 110 so as to substantially align the motor output shaft 96 with the ratchet shaft 74. The inclined surfaces 120 of the cam 110 operate to guide and align the motor coupler plates 114 with the side walls 116 of the slot 106 when coupling the two members together.

In one example of engagement of motor coupler 108 and alternate ratchet coupler 104A, on transfer of a carrier 27 into a workstation, the stationary motor 57 is horizontally aligned, and motor coupler 108 and ratchet coupler 104A automatically positioned, such that the motor coupler 108 planar plates 114 slidingly enter the ratchet coupler 104A through the respective spaces 118. On stopping of the carrier 27 at the predetermined position in the workstation, the planar plates 114 are positioned in abutting engagement, or are directly adjacent to, walls 116 and the motor shaft 96 rotational axis is aligned with the ratchet mechanism shaft 74 rotational axis. On rotation of the motor shaft 96, the planar plates 114 abuttingly engage the walls 116 causing equal rotation of the ratchet mechanism shaft 74 and the drum 72. On completion of the processing at the workstation, the motor coupler 108 is automatically returned to its original position, for example, where the planar plates 114 are aligned or parallel with the carrier 27 path of travel 21, such that on exiting of the carrier 27 from the workstation, the planar plates 114 freely pass through the openings 118 on the other side of the ratchet coupler 104A to clear the ratchet mechanism 104A from the motor coupler 108. Other devices, orientations and methods for aligning and engaging and/or disengaging the described motor couplers from the ratchet couplers 104, 104A may be used. It is further understood that different lifting mechanisms 52, ratchet devices 56 and drive sources such as motor 57 may be used to suit the particular application and performance specifications of the assembly line and system.

In one example of operation of the described motor couplers and ratchet couplers 104, 104A, one or more sensors (not shown) are used to monitor and control the rotational positions of one or both of the described motor couplers and the ratchet couplers so that the respective couplers are properly positioned in predetermined alignment as a carrier 27 enters the workstation in order to effect the respective engagement/disengagement scheme described above. For example, encoders may be used in a closed-loop system to monitor the rotational position of the motor shaft 96 and/or the ratchet shaft 74. In an example where an encoder is used for the motor shaft 96, the encoder can be in electronic communication, for example wired or through known wireless protocols, with a control system to send signals to the control system as to the present position of the respective shafts and/or couplers. The control system can compare the received current position of the motor shaft 96 (or motor coupler) and send signals to, for example, the motor 57 to ensure the motor coupler is in a position whereby the motor coupler is to properly engage or disengage the respective ratchet coupler 104, 104A at the proper point in time of the overall operating system. In one example, the described encoder is placed in communication with the control system previously described and detailed in U.S. Patent Application Publication No. US 2010/0241260. Other sensors, monitors, controllers and control systems may be used.

Referring to the exemplary ratchet mechanism 56 in FIG. 6, the ratchet mechanism 56 includes a toggle latch 122 operable to prevent unintended movement of the carrier 36 toward the lowered position. The exemplary toggle latch 122 includes a toothed or splined disc 124 having a plurality of teeth 130 fixedly attached to the ratchet shaft 74. A cantilevered lever 126 may be pivotally attached to the ratchet housing 76. An end 128 of the lever 126 may intermittingly engage a tooth 130 formed along an outer circumference of the toothed disc 124 to prevent unauthorized rotation of the drum 72 in one particular rotational direction. The toggle latch 122 does not operate to prevent rotation of the drum in an opposite direction. For example, the toggle latch 122 may operate to prevent counter-clockwise rotation of the drum 72 (as viewed from the perspective of FIG. 6) about ratchet shaft 74 when the lever 126 is engaged with the tooth 130, thereby preventing lowering of carrier 27, while also allowing unhindered clockwise rotation of the drum 72. Counter-clockwise rotation of the drum 72 may be enabled by rotating lever 126 thereby disengaging the lever end 128 from the tooth 130. The lever 126 may be manually activated or actuated using various mechanical and electro-mechanical actuators (not shown). Sensors (not shown) in communication with a local or centralized control system described above, may be used to monitor the position of latch 122. Other constructions of toggle latch 122, for example mechanical clutch or brake devices, to prevent unauthorized rotation, or to permit selected rotation, of drum 74 may be used as known by those skilled in the art.

Figure 11:
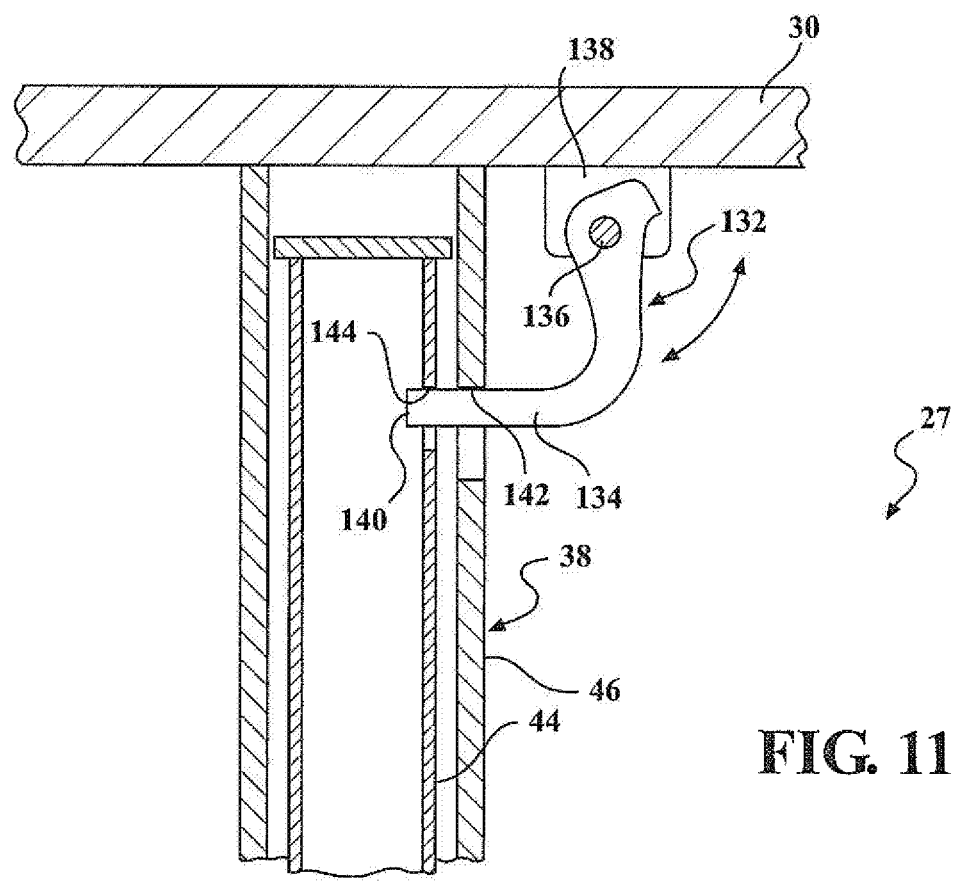
FIG. 11 is a partial side view of an exemplary auxiliary latch mechanism that may be employed with the system of FIG. 1.

With reference to FIG. 11, exemplary inverted carrier lift 10 carrier 27 includes a locking mechanism 132 for securing carrier 27 in the raised position for travel between workstations or for other purposes. The exemplary locking mechanism 132 includes a latch arm 134 pivotally connected to the support member 30 of the trolley 28. Alternatively, the latch arm 134 may be pivotally mounted to another suitable location on the carrier 27 or trolley 28. The latch arm 134 reciprocally pivots about a fixed point axis defined by a pivot pin 136 connected to the support member 30 by a bracket 138. The latch arm 134 may be selectively pivoted between a latched position, as illustrated, for example, in FIGS. 4 and 11, and an unlatched position, as illustrated, for example, in FIGS. 1-3. The exemplary latch arm 134 includes a locking pin 140 that may be simultaneously engaged with an aperture 142 in the upper post member 46 and an aligned, coaxial aperture 144 in the lower post member 44 when the carrier 27 is in the raised position. When pivoted to the unlatched position, the locking pin 140 of the latch arm 134 is selectively disengaged from the aperture 142 in the upper post member 46 and the aperture 144 in the lower post member 44, thereby enabling the carrier to be moved toward the lowered position. The latch arm 134 may be manually, mechanically, electrically, hydraulically, magnetically or pneumatically operated. The latch arm 134 may, for example, be biased, such as by a spring means or the like, towards the latched position. Other constructions or devices for latching, locking or otherwise preventing unauthorized vertical movement of carrier 36 known by those skilled in the art may be used depending on the application and performance specifications.

In examples of an automated latch arm 134, for example by an electric motor or magnetically powered actuator, the motor/actuator may be connected to a control system having a controller (not shown). The control system would be operable to monitor and/or control actuation or movement of latch arm 134 between a latched and unlatched position through energizing the motor/actuator. One or more sensors (not shown), for example mechanical or electric switches or contacts, or optical/vision systems, may be used to monitor the position of the latch arm 134. The sensor(s) can also be in electronic communication with the control system to actively monitor the position of the latch arm 134, for example, a real time, closed-loop automated monitoring and control of the latching mechanism. The control system may include preprogrammed instructions whereby, for example, the motor 57 cannot be energized when the latch arm 134 is determined or sensed to be in a latched or locked position. Equally, conveying system 20, the lifting mechanism 52 and/or the ratchet mechanism 56 can also include sensors and be in electronic communication with the above-described local or central control system, as well as the respective individual mechanisms and systems, for a semi-automated, or fully automated, closed-loop operation for system 10.

In one example of inverted carrier lift system 10 shown in FIGS. 1-5, the workstation may include a trunnion mounted fixture 148 for engaging and supporting the workpiece 146 during a processing operation at the workstation. In the example illustrated, the trunnion fixture 148 includes a rotatable frame 150, a trunnion 152 connected to the frame 150 for rotation therewith, and a drive 154, for example a rotary drive motor. The trunnion 152 may be supported by multiple rollers 156 mounted to a base 158. The drive 154 selectively rotates the trunnion 152, the frame 150 and engaged workpiece 146 reciprocally through a predetermined angular movement by rotatably driving the trunnion 152 relative to the base 158 about an axis of rotation for end plates 160, 162.

In the example trunnion 152, two circular, generally disc-shaped end plates are used for engaging workpieces 146, including a first end plate 160 and a second end plate 162. The frame 150 includes one end 164 connected to the first end plate 160 and a second end 166 connected to the second end plate 162. The frame 150 and/or the end plates 160 and 162 may support clamps, tooling, fixtures, engagement pins, sensors and other devices for receiving, positioning and/or temporarily securing the workpiece 146 to the trunnion 152, for example to the frame 150, during processing of the workpiece 146. The workpiece 146 may be supported by the trunnion fixture 148 between the end plates 160 and 162. For example, the workpiece 146 may be transferred to the trunnion fixture 148, as shown, for example, in FIGS. 1 and 2.

One or more workpiece engaging devices (not shown) may be connected to and positioned relative to the frame 150 and/or the end plates 160 and 162. The workpiece engaging device may include a tooling, nesting or holding fixtures, locating pins, clamps, and other devices for guiding, positioning, engaging and/or securing the workpiece 146 to the trunnion fixture 148. Both the first end plate 160 and the second end plate 162 may be fitted with similar workpiece engaging devices, or with different configurations or operative devices. Electric or pneumatic power and/or controls for the workpiece engaging devices, or for other structures of the trunnion fixture 148, may be directed through an aperture 168 in the end plates 160 and 162 or by other devices or structures. Control of the exemplary workpiece engaging devices may be actively monitored and controlled by the control systems, devices, hardware and/or software in a manner previously described, for example described in U.S. Patent Application Publication No. US 2010/0241260. Other devices and methods of monitoring and controlling the position and actuation of workpiece engagement devices, either locally by the workstation, or centrally in the plant facility, may be used.

In one example of inverted carrier system 10, one or more workpiece engaging devices 147 are connected to the workpiece support beam 36 and/or auxiliary arms 50 (as shown) to removably engage and secure the workpiece 146 to the carrier 27, for example, workpiece support beam 36. In one example, on transfer of the workpiece 146 to the trunnion fixture 148 for workstation processing, the one or more workpiece engaging devices 147 are disengaged or otherwise, for example by an actuator (not shown), to release the workpiece 146 from the workpiece support beam 36 and/or the auxiliary arms 150, or otherwise the carrier 27.

In one example, none of the carrier 27, lift mechanism 52, or trolley 28 includes an onboard power generation devices or control systems that require a power connection to operate. For example, as illustrated and described above, lifting mechanism 52 does not require an onboard electrical motor to rotate drum 72 which would require a power connection or hook-up when the carrier 27 is positioned in the workstation. Rather, ratchet mechanism 56 is configured to be engaged by an electrical motor 57 which is stationarily mounted in the workstation. This is advantageous to reduce complexity of the system 10 and carrier 27. A further advantage is shorter cycle times through a reduced number of, or no required, connections of power to the trolley 28 and/or carrier lift 27 when the trolley 28 enters and exits a workstation.

In one alternate example (not shown), remote power or signals may be used in order actuate actuator(s) (not shown) for the above-described workpiece engaging devices 147 mounted on the workpiece support beam 36 in order disengage/engage the workpiece 146 for transfers between the carrier 27 and the trunnion fixture 148. For example, clamps (not shown) positioned on workpiece support beam 36 used to engage workpiece 146 may require electrical or pneumatic power to actuate the clamps between an open (typically disengaged position) and a closed (typically engaged) position. In one example, on the carrier 27 positioning of the workpiece 146 in the desired position, for example a fully lowered position thereby placing workpiece 146 in the proper position on trunnion fixture 148, cooperating and mating power connection modules or connectors are used on both of carrier 27 and the trunnion fixture 148 or the workstation. For example, as described above, the trunnion fixture 148 includes a power source (for example, electrical wiring harness or pneumatic tubing and valves with an end connector/module/plug/coupling) that may extend through aperture 168. Trunnion fixture 148 may further include a connector module, plug, socket or connector block vertically positioned in the lowering travel path of the carrier 27, for example the path of the horizontal member 48 and/or auxiliary arms 50. The carrier 27, for example workpiece support beam 36, can also include a coordinating and mating power connector/block/socket/plug/coupling that is aligned with the connector/block on the trunnion fixture 148.

On lowering of the carrier lift 27 to a position where the workpiece 146 is properly positioned on the trunnion fixture 148 for processing, the coordinating power modules/blocks on the carrier 27 and trunnion fixture 148 engage thereby completing a power circuit to provide power to the carrier 127 workpiece engaging devices to disengage the workpiece 146 from the carrier 27 such that the trunnion fixture 148 fully supports the workpiece 146 for further processing. On completion of the workstation processing on workpiece 146, the carrier 27 may be re-lowered into position such that the coordinating/mating power modules/blocks re-engage thereby providing power (for example electrical, data, pneumatic) to the workpiece engaging devices 147 on the carrier 127 to re-engage the workpiece 146 and remove the workpiece 146 from trunnion fixture 148 so that the carrier 127 may be transferred to a subsequent workstation for further processing. This example is advantageous as described above due to reduced equipment and complexity of mobile carrier 27.

In one example, the workpiece engaging devices connected to the trunnion fixture 148 may be powered and operated in a similar manner through the supply of power previously described. Monitoring, actuation and control of the workpiece engaging devices may be made through communication of such devices, or sensors in communication with the devices, by a local or central control system previously described and detailed in U.S. Patent Application Publication No. US 2010/0241260. Other devices and processes to engage/disengage the workpiece 146 from the carrier 27 and/or provide power to the carrier 27 and/or trunnion fixture 148 may be used.

In the example trunnion fixture 148, the end plates 160 and 162 are rotatably supported and frictionally engaged on the rollers 156 to promote selected rotational movement of the frame 150 and the end plates 160 and 162 about a longitudinal axis of the trunnion mounted fixture 148. In one example, an outer circumferential edge 170 of each roller 156 engages an outer circumferential edge 172 of the respective end plates 160 and 162. Each roller 156 may be rotatably connected to a bracket 174 fixedly attached to the base 158. Rotation of the rollers 156 causes a corresponding rotation of the respective end plates 160 and 162 about the longitudinal axis of the trunnion mounted fixture 148. The rollers 156 are suitably configured for supporting the weight of the end plates 160 and 162, the frame 150 and the workpiece 146 connected to the trunnion mounted fixture 148.

The respective outer circumferences 170 and 172 of the rollers 156 and end plates 160 and 162, respectively, may include mating contours to help minimize axial movement of the trunnion 152 relative to the rollers 156. For example, the outer circumference 170 of the rollers 156 may include a recessed groove 176 that rollingly engages a corresponding convex shaped outer circumference 178 of the end plates 160 and 162. Other contours may also be employed. The outer circumferences of the rollers 156 and the end plates 160 and 162 may employ or include materials configured to enhance traction between the rollers 156 and the end plates 160 and 162. In one example, the rollers 156 may be made of urethane to promote frictional contact with the end plates 160 and 162. Other materials and methods of engagement may be used. Other constructions and methods for preventing or minimizing relative axial movement between the end plates 160 and 162 and rollers 156 may be used by those skilled in the art.

With continued reference to FIGS. 1 and 3, the exemplary drive 154, for example the rotary drive motor illustrated, is operable to rotatably drive at least one of the rollers 156 (powered rotation of both end plates 160, 162 shown in FIG. 2) and rotate the trunnion 152 about its longitudinal axis. The drive 154 is fixedly attached to the base 158. A drive shaft 180 (two shown) is rotatably coupled at least one of the rollers 156 to the rotary drive 154. The exemplary drive shaft 180 includes one or more universal joints 182 (two shown per drive shaft 180) to accommodate any misalignment between an output shaft 184 of the rotary drive 154 and an input shaft 186 of the roller 154. Multiple drive shafts 180 may be employed to drive multiple rollers 154. For example, in the illustrated exemplary configuration, a first drive shaft 188 is used with output shaft 184, input shaft 186 and two universal joints 182, to rotatably connect the rotary drive 154 to a roller 156 engaging the first end plate 160 and a second drive shaft 190 is similarly rotatably connected to the rotary drive 154 to a second roller 156 engaging the second end plate 162. This particular configuration enables the rotary drive 154 to supply rotary power to both end plates 160 and 162 to rotate the trunnion 152. It is not necessary, however, that both endplates 160 and 162 be rotatably driven by the rotary drive 154. In practice, one or both end plates 160 and 162 may be rotatably driven by the rotary drive 154. It is understood that other drive devices 154 other than a rotary drive motor may be used.

In operation, the drive 154 may rotate the trunnion fixture 152 in either rotational direction, as indicated by arrow 192 in FIGS. 1 and 2. With particular reference to FIG. 3, the rotary drive 154 may include a motor 192, which may be an electric motor, a hydraulic motor, pneumatic motor, or another suitably configured motor or source of power convertible to rotational movement at the end plates 160, 162. The rotary drive 154 may further include a gear set configured to tailor the output torque and rotational speed of the rotary drive output shaft 184 to accommodate the design and performance requirements of a particular application.

Figure 12:
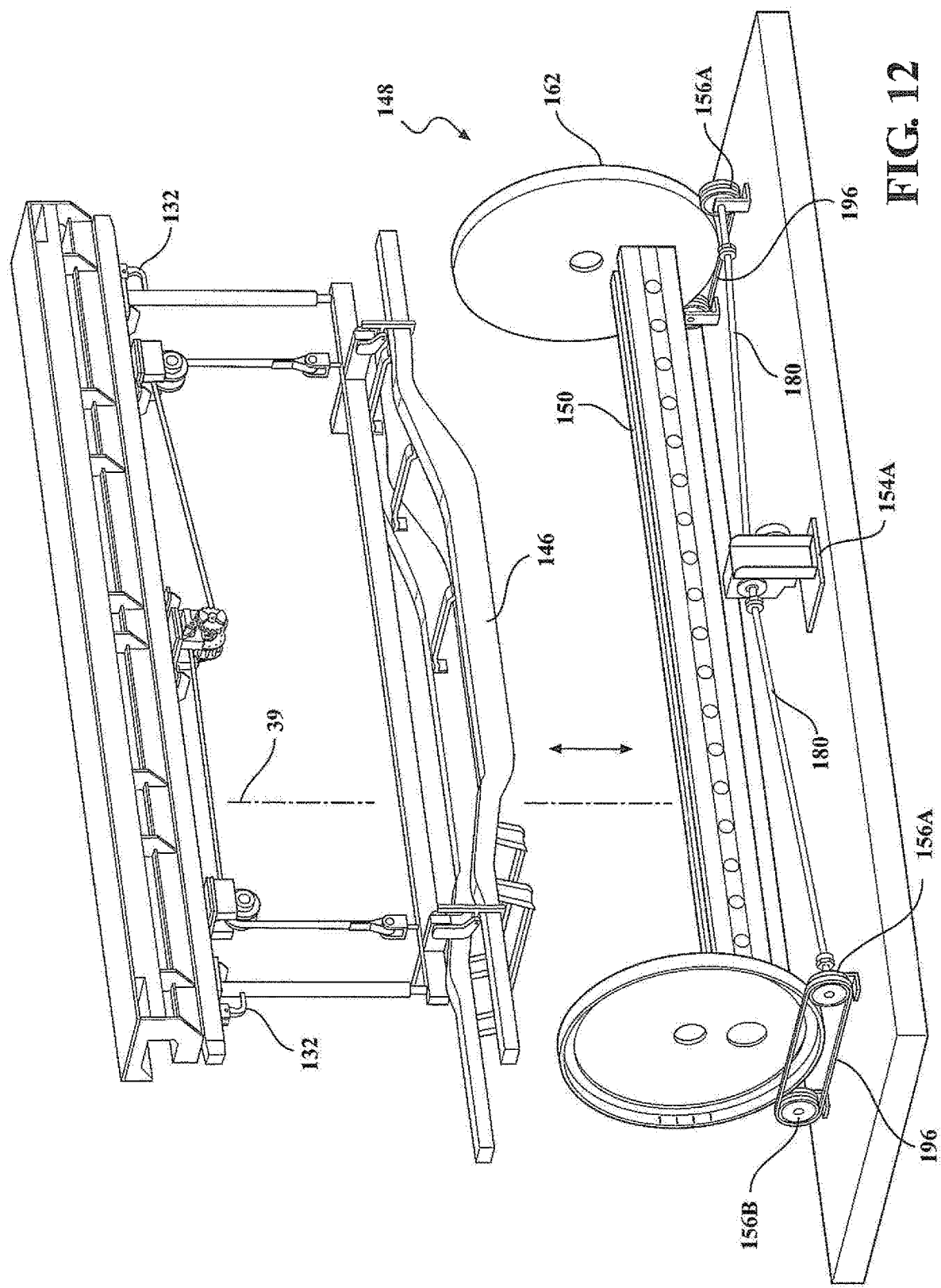
FIG. 12 is a partial front perspective view of an exemplary rotary drive configured for rotatably driving multiple rollers used to support an exemplary trunnion fixture.

With reference to FIG. 12, an alternate example of the rotary drive 154A is shown. In the example, rotary drive 154A is configured to rotatably drive two or more rollers 156A that each engages a common end plate. In the exemplary configuration illustrated in FIG. 1, the rotary drive 154A is configured to drive a single roller 156 engaging the first end plate 160 and a second roller 156A engaging the second end plate 162. To help maximize transfer of rotational torque from the rollers 156A to the end plates 160 and 162, multiple rollers 156B may be rotatably interconnected, for example, by a belt 196. This arrangement causes the rotatably interconnected rollers 156A, B to rotate substantially in unison and rotate the trunnion fixture 152 about its longitudinal axis. Alternatively, the rollers 156A, B may be rotatably interconnected by a chain, a gear set, or another device suitable for transferring rotational torque between multiple rotary devices.

In the FIG. 12 example, the belt 196 operates to transfer rotational torque delivered to a first roller 156A from the rotary drive 154 to a second roller 156B. Rotatably interconnecting multiple rollers 156A, B reduces the amount of rotational torque transferred from each individual roller to the respective end plates 160 and 162, thereby reducing the tractive force between the rollers 156A, B and the end plates 160 and 162 required to rotate the trunnion 152 without slipping. In the FIG. 12 example, the rollers 156A, B that engage the first end plate 160 are rotatably interconnected by the belt 196, and the rollers 156A, B engaging the second end plate 162 are rotatably interconnected by a second belt 196. In practice, it may not be necessary that rollers 156A, B at both ends of the trunnion 152 be rotatably interconnected.

In one example of rotary drive 154 not shown, a separate rotary drive 154 may be employed to separately drive the rollers 156 associated with each end plate 160 and 162. For example, with reference to FIG. 13, the rotary drive 154B may be rotatably connected to a single roller 156C rotatably associated with the first end plate 160. Where both end plates 160 and 162 are rotatably driven, a second rotary drive 154B may be used to rotatably drive a second roller 156C associated with the second end plate 162. As mentioned previously, the two or more rollers 156 associated with the same end plate may be rotatably interconnected by a separate belt 196.

Figure 14:
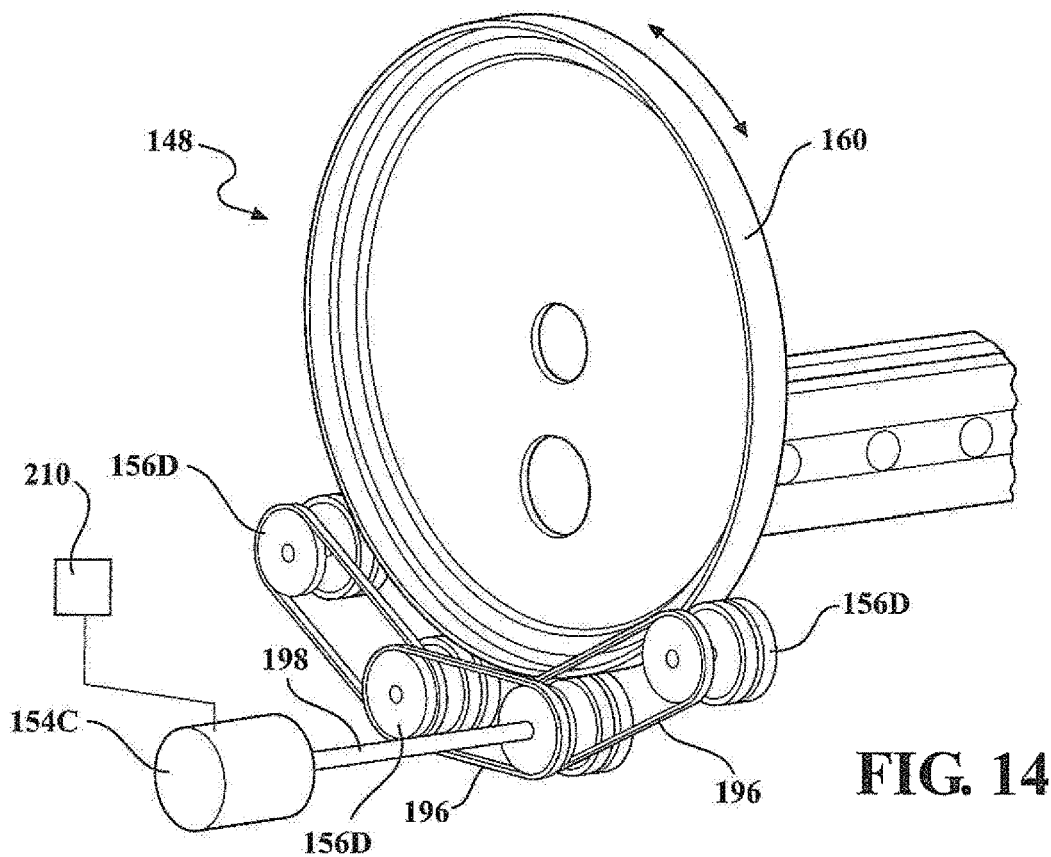
FIG. 14 is a partial front perspective view of yet another alternately configured rotary drive system configured for rotatably driving multiple rollers used to support the trunnion fixture in FIG. 12.

In an alternate example of rotary drive 154 shown in FIG. 14, two or more rollers 156D may be rotatably interconnected for rotatably driving the trunnion fixture 152. For example, in the exemplary configuration illustrated in FIG. 14, four rollers 156D are used to rotatably drive the trunnion fixture 152. Each roller 156D may be rotatably interconnected to an adjacent roller 156D by the belt 196, or another suitable connection device as previously described or known by those skilled in the art. Any one of the four rollers 156D may be rotatably connected to rotary drive 154C through a drive shaft 198. Rotary torque output from the rotary drive 154C may be transferred to the roller 156D directly connected to the rotary drive 154C by drive shaft 198 and to adjacent rollers 156D by the corresponding belts 196. In the illustrated exemplary configuration, all four rollers 156D engaging the end plate 160 are rotatably interconnected, but in practice it may not be necessary that all rollers 156D engaging a particular end plate be rotatably interconnected. A similar rotary drive arrangement, in which multiple rollers 156 are rotatably interconnected, may also be employed with the rotary drive 154C used to simultaneously drive both end plates 160 and 162, as illustrated for example, in FIG. 1.

Figure 13:
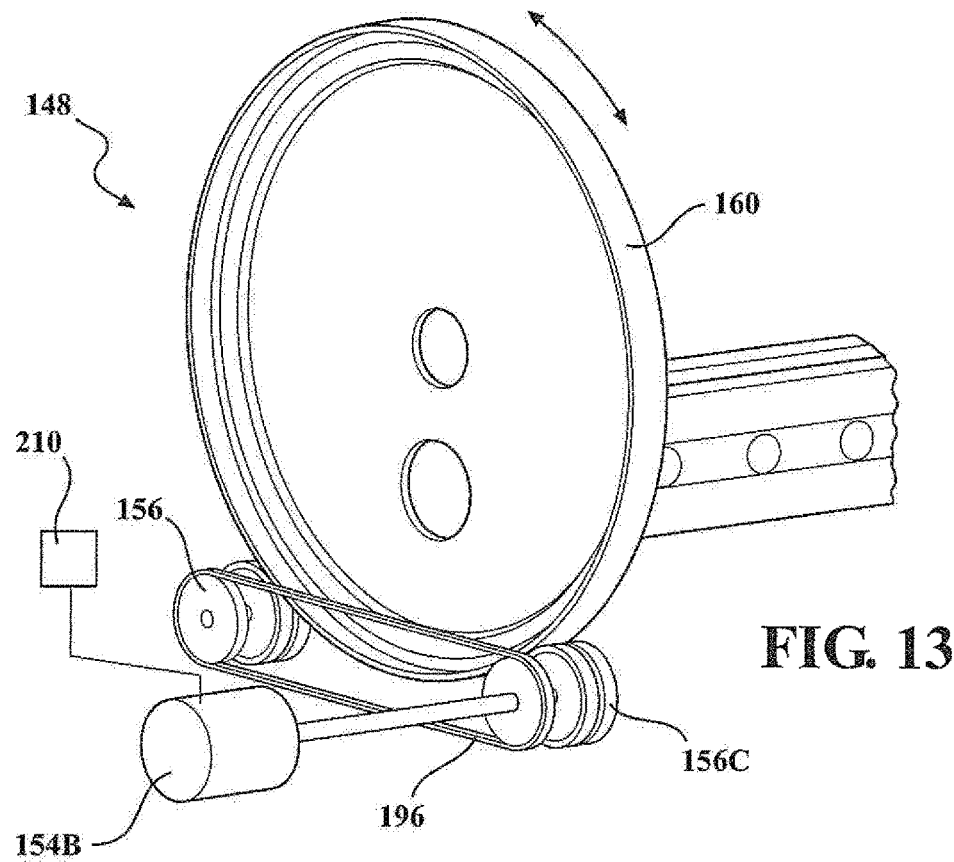
FIG. 13 is a partial front perspective view of an alternately configured exemplary rotary drive configured for rotatably driving multiple rollers used to support the trunnion fixture in FIG. 12.

In one example of described rotary drives 154, for example as illustrated in FIGS. 1, 13 and 14, the rotary drive is connected to a controller 210. Controller 210 is in electronic communication with the control system previously described for active monitoring and actuation by the control system for a semi or fully-automated, closed loop system through one or more sensors previously described. Other devices and methods to monitor and control rotary drive 154 may be used. Other sensors in communication with the controller 210 and previously described control system may be used with system 10. For example, a sensor (not shown) may be used to determine when workpiece 146 is in a predetermined and proper position with the trunnion 154 such that rotary drive 154 can be properly and automatically energized to rotate the workpiece to a predetermined position for assembly operations at that particular workstation.

It is further understood that the described workstation and process may not be an assembly or manufacturing workstation or area, but an alternate predetermined area along the assembly line path of travel 21 which serves as a temporary storage area or holding area for workpiece 146 (each considered a workstation for simplicity in this disclosure). For example, the workstation may be a production line buffer wherein workpieces that are in process are temporarily stored or racked until needed for the next stage of the assembly or manufacturing process.

Although shown as a trunnion fixture 148, different fixtures, tooling, racks and other movable and fixed devices suitable for supporting and securing workpiece 146 may be used (each referred to as a "fixture" for simplicity herein). For example, the fixture may be an indexing storage rack for temporarily holding a plurality of workpieces, for example in an in-process buffer area or an end-of-process storage area where completed parts await packaging and shipment. Other fixtures suitable for the particular workstation or process operation known by those skilled in the art may be used.

With reference to FIG. 1, a sensor 200 may be employed to monitor the rotational position of the trunnion 152. A suitable example for sensor 200 includes an encoder in communication with a closed loop control system as previously described for motor shaft 96, which precisely measures and monitors the rotational movement and position of an end plate 160,162.

With reference to FIGS. 1, 13 and 14, the controller 210 may be operably coupled to the sensor 200 and the rotary drive 154. The controller 210 may be configured to control rotation of the trunnion 152 through operation of the rotary drive 154. The final position of the carrier 36 in the workstation may also be determined by the controller 200 operating in conjunction with sensors in communication with the overhead conveyor system 20. The controller 210 may also control the rotary drive 154 to rotate the trunnion 152 in response to various inputs, for example, that the workpiece 146 has been placed in the trunnion mounted fixture 148 and is ready for processing, or that processing is completed and the workpiece 146 may now be oriented for reattachment to carrier 36 of the overhead conveyor system 20. The controller 210 may also communicate with a robot (not shown) configured to perform a processing operation on the workpiece 146 attached to the trunnion mounted fixture 148, and the carrier 27 moving along the guide rail 22. As previously described, the described trunnion fixture 148, rotary drive 154, and carrier 27 equipment described may individually, or collectively, be in electronic communication with a local and/or centralized control system, for example that described in U.S. Patent Application Publication No. US 2010/0241260, for active monitoring, actuation and control according to preprogrammed instructions through sensors and signals to, and from, inverted carrier lift system 10.

With reference to FIGS. 1-4 and 11, the carrier 27 may be moved along the guide rail 24 and is controllable to stop at a workstation by appropriate switches and/or sensors and control circuitry. In one example, the previously described control system executes preprogrammed instructions to the conveyor 20 to position and stop the carrier lift at a predetermined position at the workstation. In one example, optical sensors positioned at the workstation read a coded strip in a closed loop feedback system to precisely position the carrier lift at a predetermined position at the workstation along the path of travel 21. One suitable example is described in U.S. Pat. No. 7,108,189.

The carrier 27 supports at least one workpiece 146 during movement of the carrier 27 along the guide rail 24 with respect to the workstation. The carrier 27 may be alternately moved between the raised position, as illustrated, for example, in FIG. 4, and the lowered position, as illustrated, for example, in FIGS. 1-3, when positioned at the workstation. The locking mechanism 132 (FIG. 11) is provided for securely maintaining the carrier 27 in the raised position with respect to the trolley 28 when the latch arm 134 is arrange in the locked position, as illustrated, for example, in FIGS. 4 and 11. The locking mechanism 132 enables movement of the carrier 36 to the lowered position when the latch arm 134 is in the released position, as illustrated for example, in FIGS. 1-3.

As previously described, in one example the carrier 27 is slidably associated with the trolley 28 so as to be moveable vertically in relation to the trolley 28 to lower the workpiece 146 into the workstation, and more particularly, the trunnion mounted fixture 148, without the necessity of lowering the entire overhead conveyor system 20, as with some prior known mechanisms. In one example, the workpiece 146 is released or disengaged from horizontal member 48 and arms 50 through release of clamps or other workpiece engaging devices 147 connected to horizontal member 48 and auxiliary arms 50 in engagement with workpiece 146. The clamps or other retaining devices may be electronically connected to and controlled by the local or centralized control system including sensors previously described above.

The workpiece 146 may be retained within the trunnion 152 by one or more workpiece retaining devices previously described. Once secured to the trunnion mounted fixture 148, the workpiece 146 is ready for processing, which may include, for example, rotating the workpiece on one or more positions, for one or more welding operations or a metal forming operation designated for that workstation. For example, one or more robots (not shown) may perform a welding operation on the workpiece 146 supported by the trunnion mounted fixture 148. In one example, the trunnion 152 may reposition the workpiece 146 to another position following a process. For example, following one welding operation at the workstation, the workpiece may be rotated to another position so that a second welding operation can occur allowing better access by the second welding robot.

When processing of the workpiece 146 is complete, the trunnion 152 may be rotated by the rotary drive 154 to a predetermined rotary position in preparation for removal from the trunnion mounted fixture 148 by the carrier 27. The controller 210 or the local or centralized control system previously described may then control the carrier 27 to engage the workpiece 146 to the carrier 36 and remove the workpiece 146 from the trunnion mounted fixture 148. On completion of the predetermined operations at the workstation, the motor 57 (FIG. 10) may be selectively actuated to raise the carrier 27 and the now more complete workpiece 146 back to raised position for transport to another location within the manufacturing facility. When all operations at the workstation are complete, the overhead conveyor 20 may be actuated and the carrier 27 moved along the path of travel 21 out of the work station.

Referring to FIGS. 14-30, an alternate example of carrier lift device 10 in the form of carrier lift 310 and methods of use are shown. Where identical or like components are disclosed and/or illustrated in prior figures, the same reference numbers are used and not further described except where noted. Where minor modifications exist, or for purposes of simply distinguishing different versions of the same device, capital letters, A, B, C or D may be used. Alternately, the same base number with a higher number by one-hundred, two hundred or three hundred may be used. Where like components include the same or similar constructions and/or functions, the same names are used although different reference numbers may be assigned.

Figure 15:
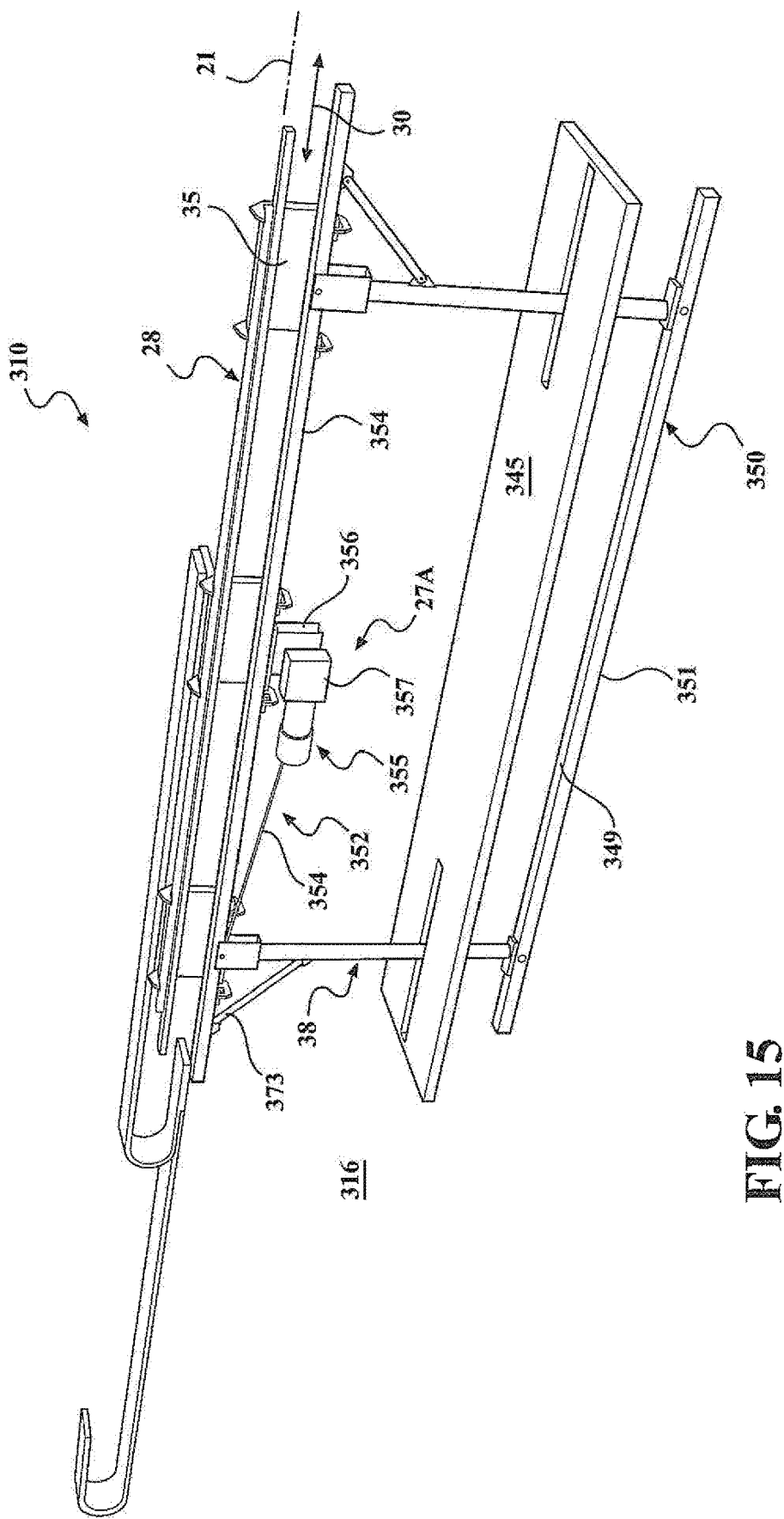
FIG. 15 is a perspective view of one example of a flexible elevated transport carrier.
Figure 25:
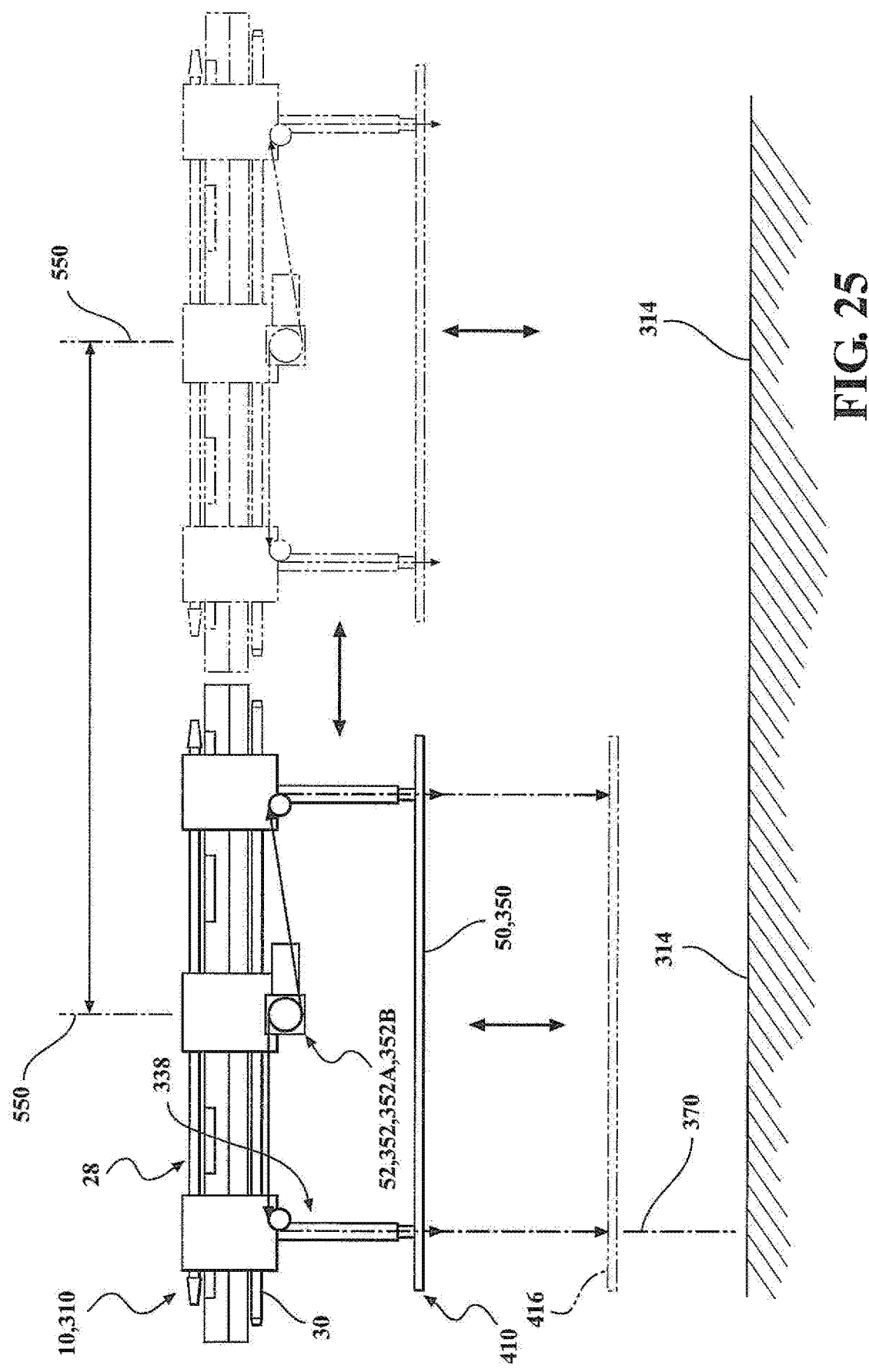
FIG. 25 is a side view of one example of a flexible elevated transport carrier.

Referring to FIGS. 15, 16 and 25, an example alternate carrier 310 is shown. In the example, carrier 310 is shown in an exemplary use for supporting and transporting vehicle components or other workpieces 146 previously described, progressively assembled in a plurality of sequential workstations 314 along an assembly line 316 defining a path of travel 21 by the carrier 310.

The exemplary carrier lift 310 is preferably includes trolley 28 engaged with an elevated or overhead conveyor 20 for movement of the trolley 28 and carrier along an assembly line path of travel 21 as previously described for alternate carrier 10.

Still referring to FIGS. 15 and 16, the exemplary carrier lift 310 and carrier 27A further includes an exemplary platform 346 and a workpiece support beam 350 having an upper surface 349 and lower surface 351 as generally shown. In an alternate example of support beam 36, carrier 27A includes support beam 350 which can be of the same or similar construction as workpiece support beam 36 as previously described and illustrated in FIG. 2 (collectively referred to as "workpiece support beam" or "support beam"). Referring to FIG. 2, an alternate example of support beam 350 (not shown) includes two pairs of extension members or arms 50 transversely extending from beam 350. Arms 50 may be selectively connected to, or be integral with, support beam 350 to suit the specific application and workpiece 146 to be supported and conveyed along assembly line path of travel 21.

In a preferred example, support beam 350 and arms 50, or other attachment and workpiece engaging devices, are modular in nature and can be quickly connected and disconnected to support beam 350 to quickly change the support beam 350 configuration to, for example, accommodate different components or vehicle styles to support dynamic random build sequences (vehicle models A, C, D, B, E), or batch build assembly sequences (vehicle models AAA, BBB, CCC, DDDD). Although shown as straight bars, support beam 350 and extensions 50 can take other forms, shapes and configurations to suit the particular application as known by those skilled in the art. Respective rails 30, beams 350 and arms 50 are preferably made from aluminum or steel but can be made from other materials known by those skilled in the art. It is further understood that support beam 350 can include workpiece engagement devices 147 as previously described (not shown in FIGS. 15-30) to selectively, securely and releasably engage various workpieces 146 in the manner and operation generally described for carrier lift 10. For example, pneumatic clamping devices which are actuated through pressurized airlines may be used to clamp and hold a workpiece 146 until a control system actuates the clamps to release component 146 as generally described above. Other engagement devices, mechanisms and ways to control them known by those skilled in the art may be used.

Referring back to FIGS. 15 and 16, exemplary carrier lift 310 and carrier 27A includes an alternate lift mechanism 352. In the example, lift mechanism 352 includes two telescopic posts 338 having similar construction and function as telescopic posts 38, including a lower post member 344 and an upper post member 345 movable along an axis of travel 370, similar to lower post member 44 and upper post member 46, as generally described above. A stop (not shown) may be included to prevent overextension of telescopic posts 338, for example, lower post member 344 extending too far and disengaging from upper post member 345. Telescopic rods 338 may include other devices within upper post member 345 to assist in the control and movement of lower post member 344, for example, bushings, bearings and/or other devices as known by those skilled in the art. Other constructions, configurations and positioning of telescopic posts 338 with respect to support member 30 and support beam 350 may be used as known by those skilled in the art.

In the example carrier lift 310 carrier 27A shown in FIG. 15 each telescopic post 338 includes a brace 373 connected to support member 30 and upper post member 345. In one example, brace 373 assists to keep the respective post 360 in a vertical orientation and may further prevent or reduce rotation and/or linear movement in the geometric X direction (along path of travel 21) or along the geometric Y direction (transverse to path of travel 21). Other devices and mechanisms to prevent or reduce rotation (rocking) or linear movement of the lift mechanism 352 relative to the overhead conveyor 20 may be used as known by those skilled in the art.

Referring to FIGS. 17-19, and 26-30 alternate examples of carrier 310, carrier 27B and lift mechanism 352A are shown. Referring to FIGS. 17 and 18A and 18B, carrier 27B and lift mechanism 352A alternately employs a scissor-type lift mechanism 426. In the example, scissors lift mechanism 426 includes a first link 430 (two shown) and a second link 436 (two shown) respectively connected to support member 30 and workpiece support beam 350 and each other at pivot points 440 as generally shown. First 430 and second 436 links rotate about pivot points 440 to raise to position the support beam 350, platform 346 if used, between a raised position 410 shown in FIG. 18A and a lowered position 416 as shown in FIG. 18B through a lift mechanism drive 355 further described below.

Figure 19:
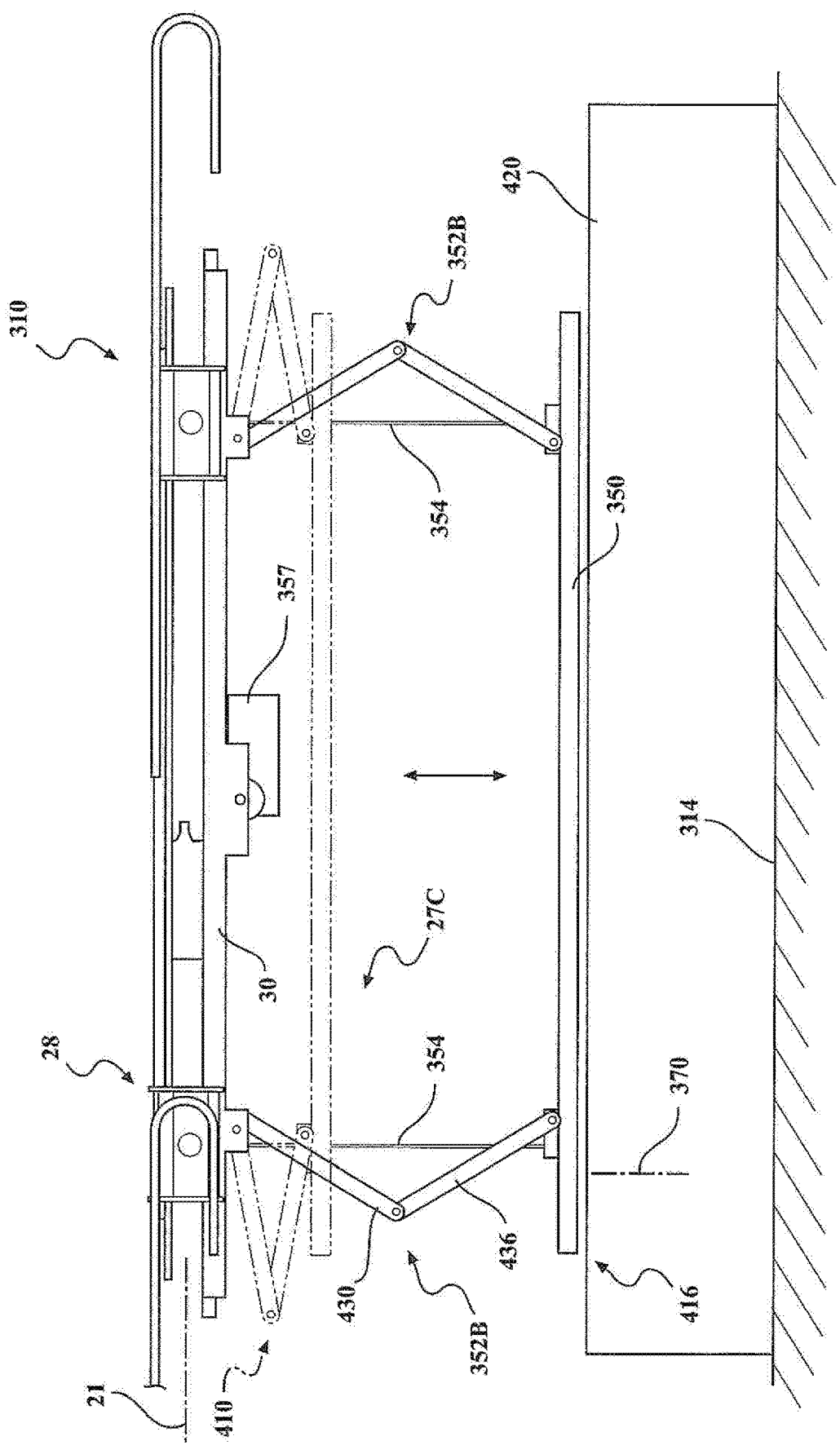
FIG. 19 is a side view of an alternate example of a flexible elevated transport carrier shown concurrently in a lowered and a raised position.

In the example carrier 27B and lift mechanism 352A shown in FIGS. 17 and 18A and 18B, the links 430 and 436 are positioned inward toward each other. In the alternate lift mechanism 352B and carrier 27C example shown in FIG. 19, the links 430 and 436 are positioned outward and away from each other as generally shown (FIG. 19 showing the carrier 310 in both the upper position 410 (in phantom line) and the lower position 416 (solid line). The alternate positioning and/or configuration of scissor links 430 and 436 provide flexibility and packaging of the carrier lift 310 and carrier 27B and C to suit and better accommodate the assembly process, workpiece 146 (not shown), assembly tooling (not shown), other equipment (not shown) positioned in the workstation 314 or along assembly line 316, or the assembly predetermined assembly process. Links 430 and 436 are preferably made from aluminum or steel, but may be made from other materials suitable for the application and performance specifications as known by those skilled in the art. Although shown as using two links 430 and 436, it is understood that a different number of links and/or alternate configurations of links known by those skilled in the art may be used.

The example carriers lifts 310 and carriers 27A, B and C shown in FIGS. 15-19 further include an alternate lift mechanism drive 355 used to power and control the movement of workpiece support beam 350, platform 346 (if used), and workpiece 146 if connected thereto along the travel axis 370 described above. Example lift mechanism drive 355 includes an electrical motor 357 preferably directly engaged with a drum 372 which is engaged with an elongate tether 354. Tether 354 is similar in construction, and alternative constructions, as described above for tether 54. A ratchet mechanism 356 is not preferred due to the direct engagement of the motor 357 to the drum 372, but may be used where an application or performance requirements dictate use.

Referring to the example carrier lift 310 and carrier 27A shown in FIGS. 15 and 16, exemplary elongate tether 354 is connected at a first end 358 (to the left in FIG. 16) to the support beam 350, continuously extends upwardly and coaxially through telescopic rod 338, over a pulley 406, through drum 376, over a second pulley 406 and downwardly through the other telescopic rod 338 to connect to support beam 350 at a tether second end 360. As described above, or in the alternative, tether 354 may be a chain, braided cable, belt or other device suitable for the application as known by those skilled in the art. As described above for tether 54, although shown as a single tether 354, more than one tether 354 may be used per lift carrier 310.

Referring to the example carrier lift 310 and carrier 27B shown in FIGS. 17-19, exemplary elongate tether 354 is connected at the first end 358 (to the left in FIG. 17) to the support beam 350, continuously extends upwardly over the pulley 406, through drum 376, over a second pulley 406 and downwardly to connect to support beam 350 at the tether second end 360. In exemplary operation, on energizing motor 357, drum 372 rotates so as to increase or decrease the length of tether 354 between the motor 357 and first 358 and second 360 tether ends to respectively lower or raise support beam 350 and workpiece 146 if connected thereto. In one example, drum 372 selectively spools out tether 354 to increase the effective length between attachment points 358 and 360 to lower support beam 350 or gathers and winds tether 354 to decrease the effective length of tether 354 to raise support beam 350 and workpiece 146 if connected thereto.

Referring back to FIGS. 6 and 7, in one example, carrier lift 310 lift mechanism 352 may include a ratchet mechanism 356 connected to drum 376 in a similar construction and manner as previous described for alternate lift mechanism 52, ratchet mechanism 56 and drum 72 as previously described. In the exemplary carrier lift 310 and carrier 27A or B, tether 354 is engaged with drum 372 in a similar manner, and in similar alternatives, as previously described for carrier lift 10. In the alternate lift mechanism 352 shown in FIGS. 15-19, motor 357 is connected to support member 30 as opposed to being separate from carrier 310 and stationarily mounted in the workstation as described for carrier lift 10. In one example, motor 357 engages ratchet mechanism 356 to selectively rotate ratchet mechanism 357 and drum 372 to take up or gather a length of tether 354 around drum 372 to raise support beam 350, or to let out or unspool a length of tether from drum 354 to lower support beam 352 to a lowered position 416, or any position along the axis of travel 370. A toggle latch 122 is used to prevent unauthorized rotation of drum 372 raising or lowering of tether 354 as described above for carrier lift 10. Other devices, and alternatives, described for carrier lift 10 may be used for alternate carrier 310. As noted above, in a preferred example, ratchet mechanism 356 is not used and motor 357 is engaged directly with drum 372.

In the example lift carrier 310 and carrier 27A-D shown in FIGS. 15-19 and 26-30, wherein the motor is connected to support member 30 or is "onboard" carrier 27A-D, motor 357 can be a common electrical motor with a rotating output shaft (not shown) engaged with the ratchet mechanism 356 and drum 372 as previously described. Alternately, motor 357 may be a pneumatic motor, a linear motor, an inductive motor, or other motor as known by those skilled in the art. An electrical power source to the motor 357 may also be onboard carrier 310 or connected to, for example, support member 30 and provide continuous electrical power to motor 357. Alternately, electrical power may only be supplied to motor 357 when carrier 310 arrives and is properly positioned in workstation 314, for example, coordinating electrically conductive contact plates or induction devices which complete an electrical circuit between carrier 310 and workstation 314. Other devices and methods of establishing electrical power to motor 357 known by those skilled in the art may be used. Equally, other service lines, for example pressurized air, electronic and/or data communication between the workstation 314 and carrier 310 may be employed such that the exemplary service lines are automatically connected on arrival and positioning of carrier 310 in a workstation 314 to power, for example, motor 357 and workpiece engaging devices 147 connected to support beam 350. For example, pressurized air may be used to actuate clamps positioned on support beam 350 to engage workpiece 146. Alternately, on sensing or detecting carrier 310 is positioned at a workstation 314 or other predetermined location along path of travel 21, actuators may activate and physically connect the service lines allowing communications of electrical power, data, pneumatic, hydraulic and other service lines between workstation 314 and carrier 310.

For example carrier lifts 10, 310, a centralized controller (not shown) connected to, or onboard, carrier 310 may be in communication with other controllers or actuators onboard carrier 310 to execute signals which energize or actuate motor 357 and workpiece engaging devices 147. The carrier 310 central controller may be in communication, for example hard wire or wireless protocols, with a local workstation or assembly line controller or an assembly plant programmable controller to send and receive signals, data and/or instructions to actuate the motor 357 and workpiece engaging devices 147 in a predetermined sequence as generally described above or described herein. Equally, sensors (not shown) may be included for motor 357, workpiece engaging devices 147 and other equipment connected to carrier lift 310 to actively monitor, in a closed loop feedback system, the precise position and/or operations status of the respective equipment and send signals to the local or centralized assembly plant controllers and control system as previously described for carrier lift 10. The previously mentioned controllers and control systems may each include a central processing unit (CPU), memory storage devices for storing preprogrammed instructions and received signals and/or data, transmitters, receivers, input and output devices, and buses to place the respective components in communication with each other. Other devices for the described controllers and control system known by those skilled in the art may be used.

Figure 20:
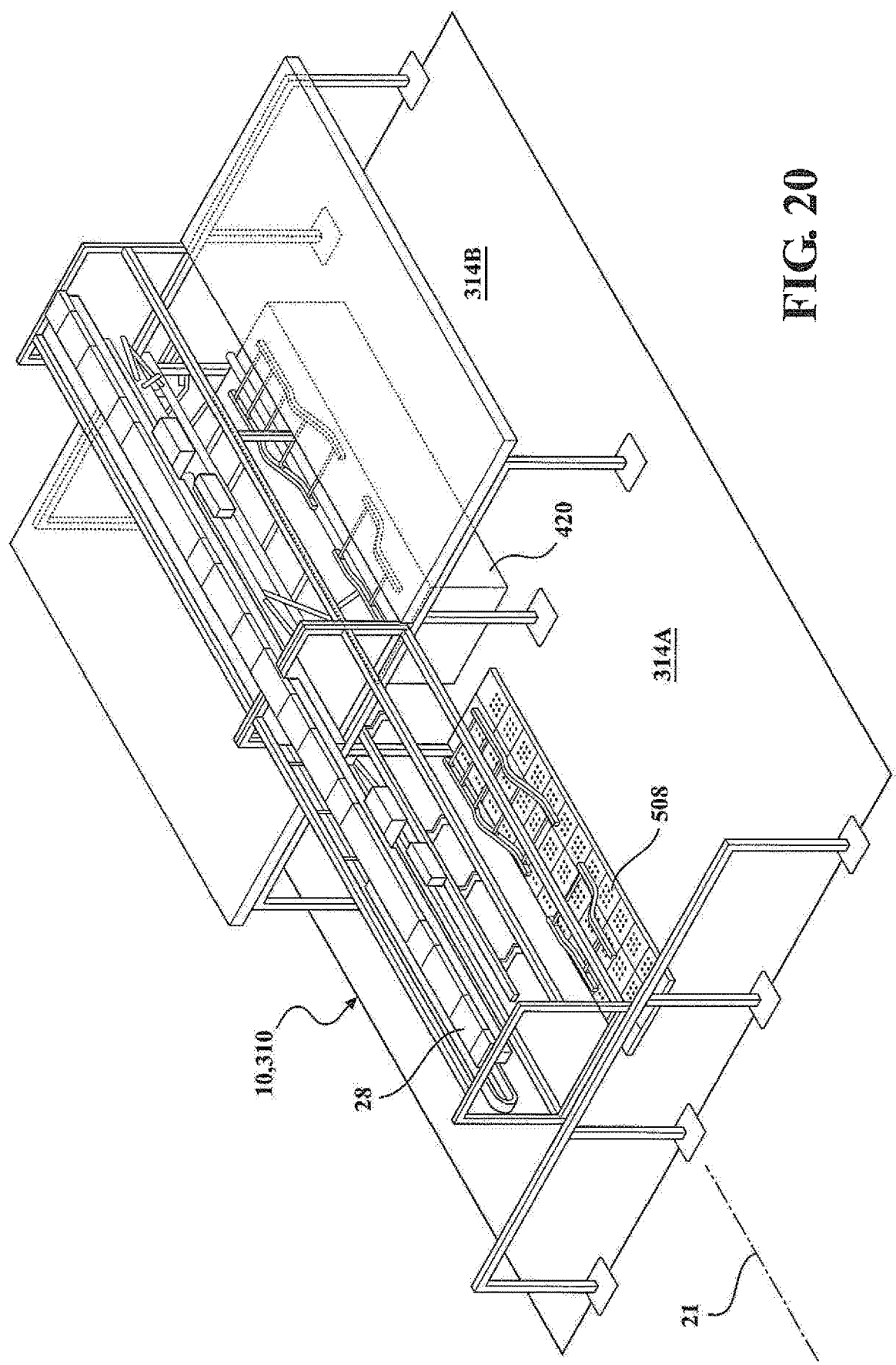
FIG. 20 is a perspective view of an example application of one example of a flexible elevated transport carrier.
Figure 21:
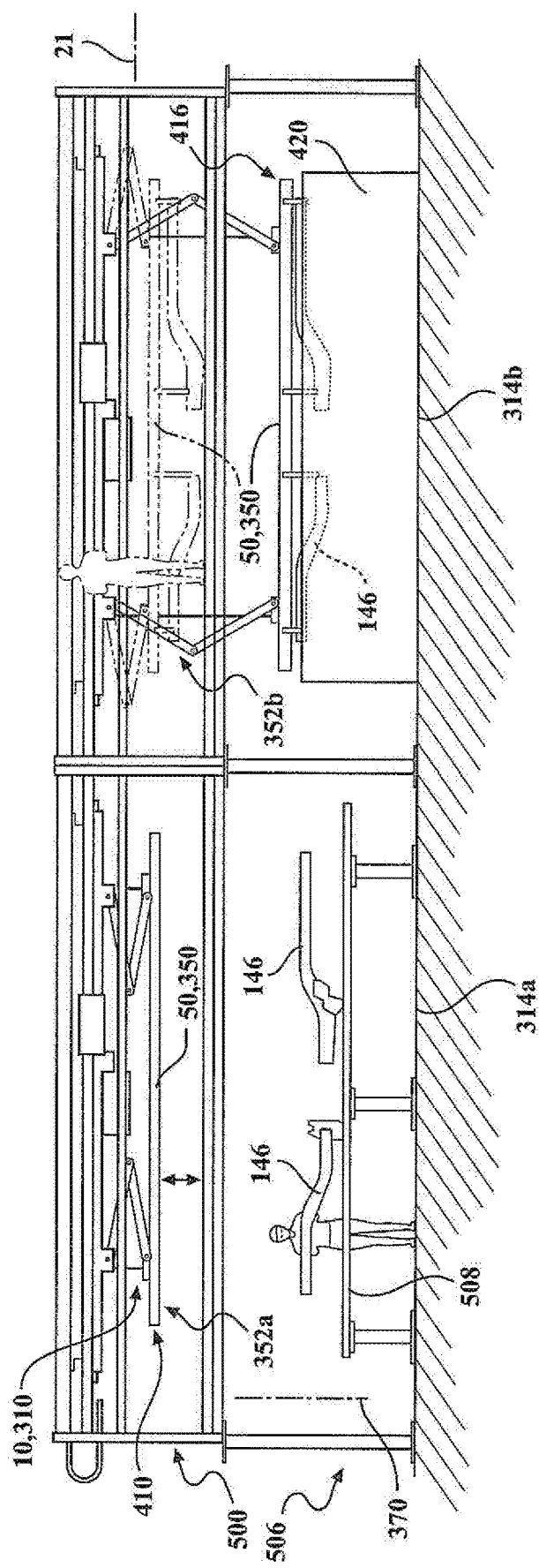
FIG. 21 is a side view of the example shown in FIG. 20.

Referring to FIGS. 20 and 21, an example application and method of use of carrier lifts 10, 310 and carrier 27A, B or C (27C shown) in an assembly line 316 with two sequential workstations 314A and 314B along the path of travel 21. In the example, first station 314A is set up to be a manual load inspection station including an elevated work table 508. In one example, work table 508 serves as an area where operators can conduct manual placement of components on the table 508 for manual assembly operations or to simply position the components in holding fixtures or other tooling for further processing or assembly. In one example, work table 508 includes a grid of precision through holes 509, for example every 100 millimeters (mm) in an X and Y coordinate direction, wherein precision tooling or fixtures are secured for accurate and precision positioning of workpieces 146 for further processing. See for example the platform or table 346/508 shown in FIG. 24.

As best seen in FIG. 21, carrier lift 10, 310 (310 shown) and carrier 27A, B or C (C shown) and workpiece support beam 36, 350 is positioned in a raised position 410 at an upper level 500 while table 508 is positioned on a lower level 506 of the exemplary scaffolding or frame structure. On completion of the work by the operators in workstation 314A, lift mechanism 52, 352 can be energized and workpiece support beam 36, 350 can be lowered to a lower position 416 to the lower level 506, wherein workpiece engaging devices 147 are actuated to engage one or more workpieces 146 positioned on work table 508. Lift mechanism 52, 352 can them be energized to raise support beam 36, 350 with engaged workpiece(s) 146 to a higher or raised position 410 along travel axis 370 and then moved down to the next workstation 314B for further processing. In one example, workpieces 146 are loaded onto work table 508 by devices other than carrier lift 10, 310, for example programmable robots or human operators wherein carrier lift 10, 310 then engages the workpieces and raises carrier 27A, B or C in the manner described.

In the example, workstation 314B is an automated work station which may include, for example, a plurality of programmable multi-axis robots (not shown) to further conduct assembly operations on the progressively assembled workpiece 146. In the example workstation 314B, carrier lift 10, 310 and carrier 27A, B or C (C shown) may lower support beam 36, 350 and engaged workpiece 146 to a lowered position 416 to the workstation lower level 506, or to another elevation along travel axis 370, into what is schematically shown as a tooling area 420.

Tooling area 420 may be an area of the workstation which contains holding or welding fixtures, for example trunnion fixture 148 or other fixtures, tooling or supports described herein, which secure workpieces 146 in a predetermined position so that, for example, spot welding by the industrial robots can take place. In one example, lift mechanism 52, 352 selectively, for example through control signals sent by a local or central control system as described above, lowers the workpiece 146 onto the fixtures or other tooling in tooling area 420 and then disengages the workpieces 146 in a manner previously described by workpiece engaging devices 147, and then is raised to so as to be clear of the travel paths of the robots so the predetermined assembly or manufacturing work can take place.

On completion of the predetermined work in workstation 314B, in a preferred example, the carrier 27A, B or C positioned above the workpiece 146, rises and returns to workstation 314A to engage a new or next workpiece positioned in workstation 314A, rises and delivers the next workpiece in workstation 314B. The completed workpiece in workstation 314B is retrieved by a second carrier lift 10, 310 positioned in a subsequent workstation positioned downstream along path of travel 21 to retrieve the workpiece from workstation 314B and deliver it to the next downstream workstation (not shown) along path of travel 21. This process continues with the carrier lift 10, 310 moving only between workstations 314A and 314B as the workpiece progressively moves down path of travel 21.

Alternately, carrier 10, 310 positioned in workstation 314B may be lowered, re-engage workpiece 146 in the manner previously described, and through overhead conveyor 20 and trolley 28 move along the path of travel 21 downstream to the next workstation in assembly line 316 (not back to workstation 314A as described above). In one example as shown in FIG. 21 workstation 314B, on raising the carrier 10, 310 to upper level 500, further manual operations may take place prior to carrier 10, 310 moving along path of travel 21 to the next workstation. It is also understood that on completion of work in workstation 314B, the carrier lift 10, 310 may be moved back to workstation 314A with original workpiece 146 for more assembly or process work in a cyclical manner back and forth between two or more workstations to suit the particular application.

Although workstation 314A and 314B are described as being manual and automated assembly setups and functions, it is understood that the workstations may be reversed in order, for example automated assembly first then manual operations, or may be a combination of both manual and automated operations in the same workstation depending on the application. It is further understood that different operations may occur than those described. For example, automated robots (not shown) may grasp and position workpiece 146 and place them in tooling fixtures in workstation 314A instead of manual operations depending on the application.

An advantage of carrier lift 310 carriers 27A, B and C and workpiece support beam 350 is that support beam 350 may be used to engage workpieces 146 on the support beam 350 underside or lower surface 351 (similar to support beam 36 previously described) or on the support beam 350 upper surface 349. When engaged on lower surface 351, for example as shown in FIG. 1 for carrier 10, carrier 310 can then lower and place the workpiece 146 into awaiting fixtures, for example trunnion fixture 148, and/or tooling positioned in the tooling area 420. Alternately, and with an advantage of process flexibility, when advantageous to engage and position a workpiece 146 in an upward facing orientation on support beam 350 upper surface 349, or a support platform 346 shown in FIG. 15, this facilitates alternate operations, for example manual assembly workstations.

Figure 22:
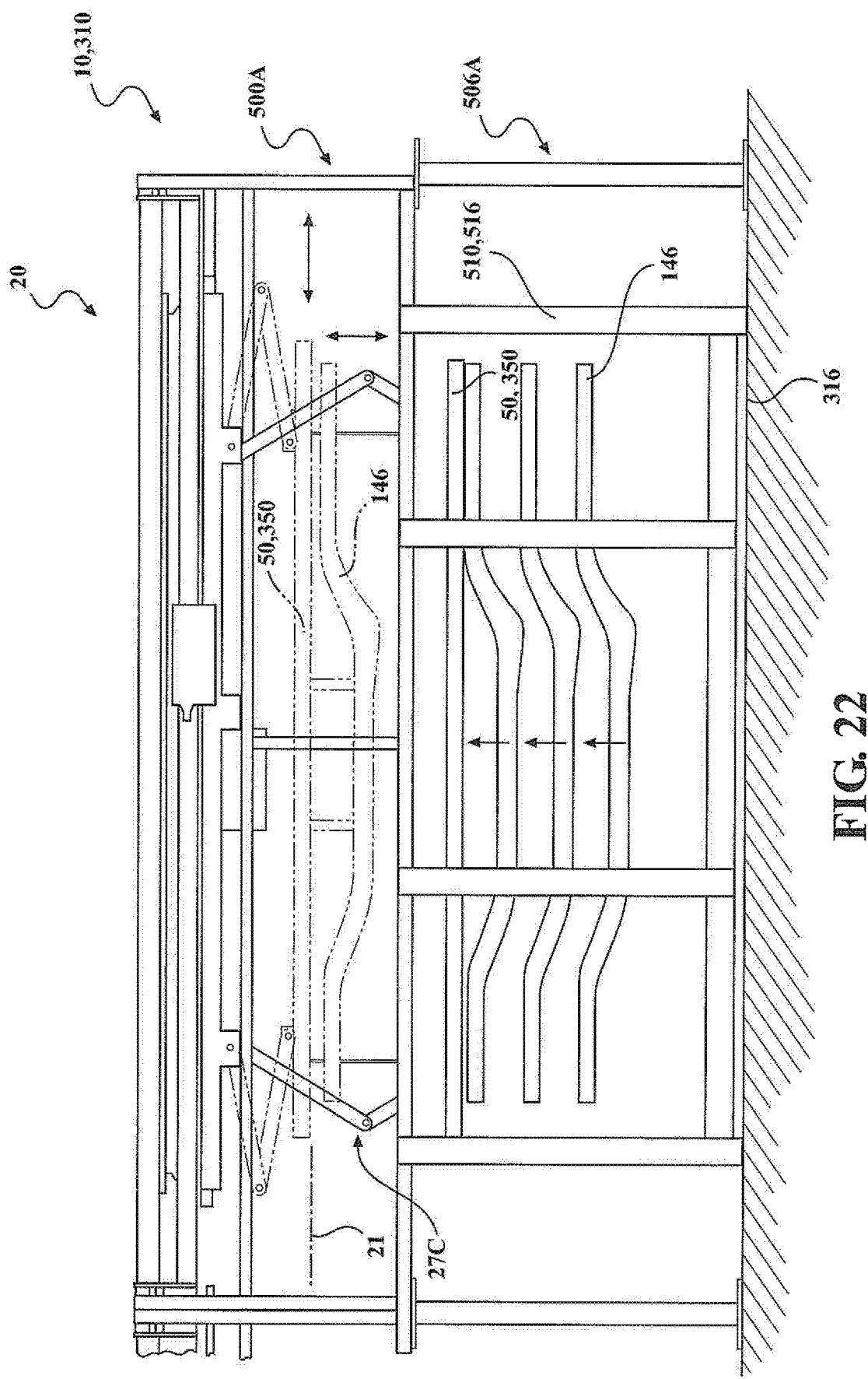
FIG. 22 is a side view of an example application of one example of a flexible elevated transport carrier.

Referring to FIG. 22 an example of an application for carrier lift 10, 310 and carriers 27A, B and C (C-shown) is shown for use with a vertical workpiece storage stacker or buffer 510 positioned along path of travel 21. In the example, a workpiece stacker 510 includes a cradle or component dunnage 516 positioned in a workstation at a lower level 506A, for example a tooling area 420 described above. In the example, partially assembled or completed workpieces 146 are vertically stacked or oriented pending further assembly processing or packaging and shipping. This stacking may occur anywhere along an assembly line 316 path of travel 21, for example at the beginning of an assembly line where workpieces 146 are stored awaiting introduction to an assembly line or at the end of an assembly line waiting to be transferred to the next assembly line. Alternately, for example, a mid-assembly line buffer area is needed in the event a downstream assembly line is temporarily halted or shut down allowing the upstream assembly line to continue operating.

In the example, a plurality of workpieces 146 are vertically stacked as generally shown. Carrier lift 10, 310 is positioned in the workstation 316 at an upper level 500A or raised position 410 and then lowered through lift mechanism 52, 352 to engage the exposed workpiece 146 through, for example, actuation of workpiece engaging devices 147 as generally described above. Carrier 10, 310 is then raised by lift mechanism 52, 352 as described above and moved to the next workstation down the assembly line path of travel 21. Alternately, carrier 10, 310 may be used to place or deposit workpieces 146 into the stacker 510 and cradle 516 in a similar manner as placing workpieces in a fixture, for example trunnion fixture 148, as described above.

As the exposed workpiece 146 in stacker 510 may be at different heights depending on the current capacity of stacker 510, sensors or other monitoring devices may be used to signal a central controller which then calculates the proper amount for carrier 10, 310 and support beam 36, 350 to lower into tooling area 420 to properly engage the exposed workpiece 146. Alternately, stacker 510 may include devices which automatically position the highest or exposed workpiece 146 at a predetermined and known height so that carrier lift 10, 310 may be lowered to the same lowered position and engage workpiece 146 at a known height position. Other stacker devices 510, constructions, orientations and operations known by those skilled in the art may be used.

Figure 23:
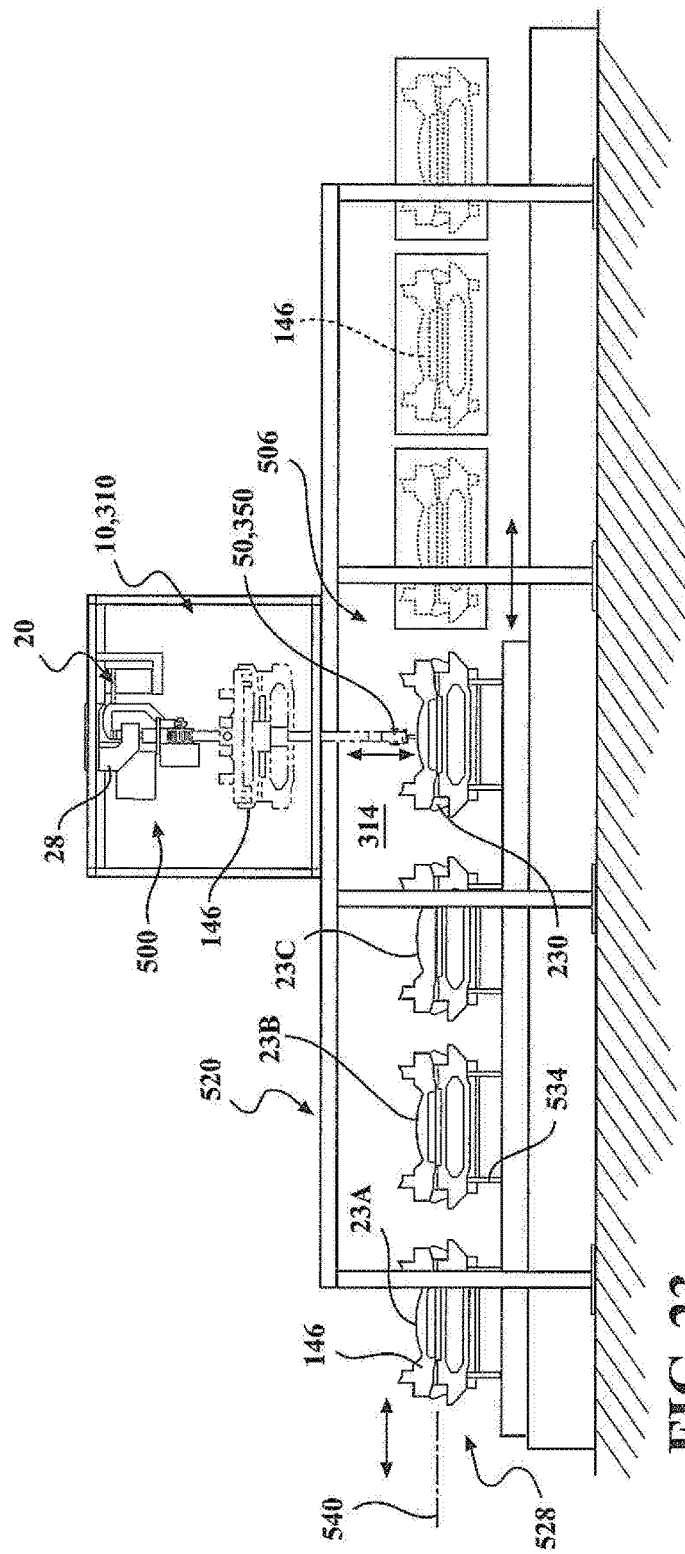
FIG. 23 is an end view of an example application of one example of a flexible elevated transport carrier in use with a component buffer shuttle.
Figure 24:
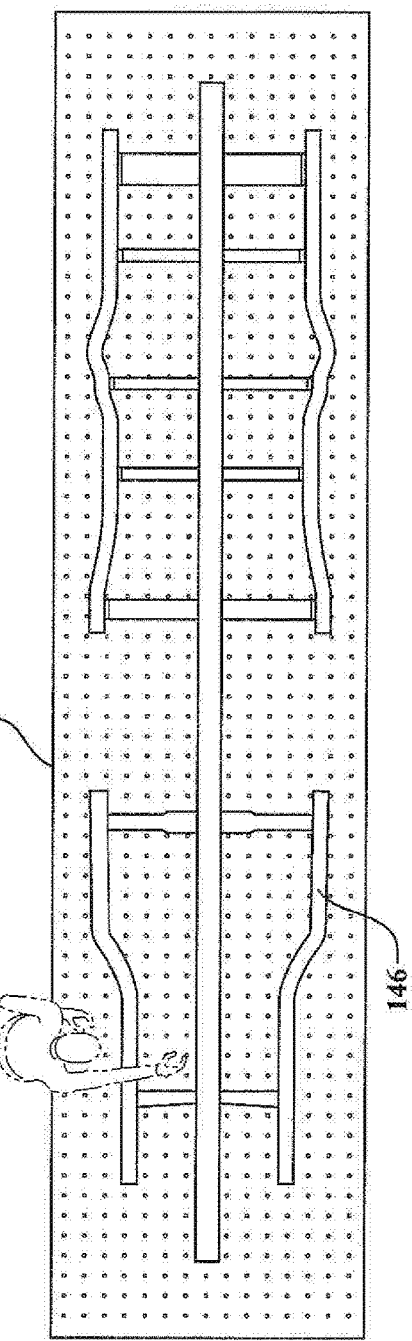
FIG. 24 is a top view of one example of a flexible elevated transport carrier showing example components.

Referring to FIG. 23, an example application of carrier lift 10, 310 in use with an exemplary transverse powered conveyor 528 is shown. In the example, a transverse powered conveyor 528 is positioned perpendicular or transverse to assembly line 316 path of travel 21. The exemplary powered conveyor includes a pallet 532 which may include holding fixtures or other tooling to support and carry workpieces 146 in a known and predetermined position for assembly or manufacturing processing. Pallet 532 is preferably positioned on a powered roller frame transport 538. In the example, the powered roller frame includes powered rollers which frictionally engage the pallets 532 to selectively propel the pallets 532 along a path of travel 540, to and from, an area or workstation 314 beneath carrier 10, 310 as generally shown. In the example, conveyor or shuttle 528 cycles to position a workpiece 146 into position below carrier 10, 310 whereby carrier 10, 310 and workpiece support beam 36, 350 is lowered to engage the workpiece 146, raise the engaged workpiece 146 and transfer the workpiece 146 to the next workstation 314 along path of travel 21 as previously generally described. A suitable example of a powered pallet and roller transport 532, 538 is the VERSAPALLET® device by Comau LLC which is described in U.S. Pat. Nos. 6,966,427; 7,232,027 and/or 6,564,440 the entire contents of which are each incorporated herein by reference. Other conveyor devices and tooling change devices known by those skilled in the art may be used.

In one example, conveyor 528 operates as a "first-in-first-out" type of system where the workpieces 146 are kept in sequential order in the production assembly sequence. This is useful and advantageous to support the complex assembly build sequences in automotive assembly where, for example, random or short batch build sequences described above are used. The carrier lift 10, 310 device is useful and fully supportive of this sequenced part or component delivery systems described in U.S. Pat. Nos. 8,869,370 and 9,513,625 the entire contents of which are incorporated herein by reference.

In another example of powered conveyor 528 (not shown), a second powered roller transport 528 and pallet 532 is used on the opposite side of carrier lift 10, 310 (to the right of carrier 10, 310 in FIG. 23, not shown, workpieces shown in phantom line). In one example, the shown pallet and powered transport to the left and a pallet and conveyor to the right alternatingly cycle back and forth, to the right and the left, alternatingly providing selected workpieces 146, for example 23A-D to carrier 10, 310. In one example shown in FIG. 232, if carrier lift 10, 310 requires access/engagement with component 23A, pallet 532 will move to the right positioning component 23A within workstation 314 and into position to be engaged by carrier 10, 310.

In an alternate example, all of the workpieces 23 on the left transport conveyor 528 may be used or engaged and removed by carrier lift 10, 310 before any from a right transport 528 (not shown) is employed and workpieces thereon used or processed. This may be useful in batch build assembly sequences where all of the components on one transport conveyor 528 are for one vehicle body type and another transport 528 may include workpieces 146 for an alternate vehicle type. Other combinations, constructions and orientations of transport conveyors 528 may be used as known by those skilled in the art.

As noted above, carrier lift 10, 310 carriers 27, 27A, B and C and the variously described workstations 314 may include a plurality of sensor devices, for example, vision, optical, laser, pressure and limit-type switches, which all may be in communication with a local and/or central controller as described above in a closed loop, feedback system to continuously monitor, control and send data to and from the carrier 10, 310, so the carrier 10, 310 and assembly line is highly monitored and controlled for present and historical operations data.

Referring to FIG. 25, carrier lift 10, 310 also includes the ability to adjust the pitch or distance 556 between workstation 314 centerlines 550 to properly position carrier 10, 310 at the various workstations 314 along assembly line 316. In one example, the pitch 556 is eight (8.0) meters (m) (26 feet) and the lift or travel range 560 of carrier 10, 310 workpiece support beam 36, 350 along axis of travel 370 is 1.5 meters (m) (5 feet). In one example, carrier 10, 310 is capable of traveling the pitch distance 556 in five (5) seconds (s) or less and the lift 560 in three (3) seconds (s) or less. Other distances 556, 560 and times may be used to suit the particular application and performance requirements as known by those skilled in the art.

Figure 26:
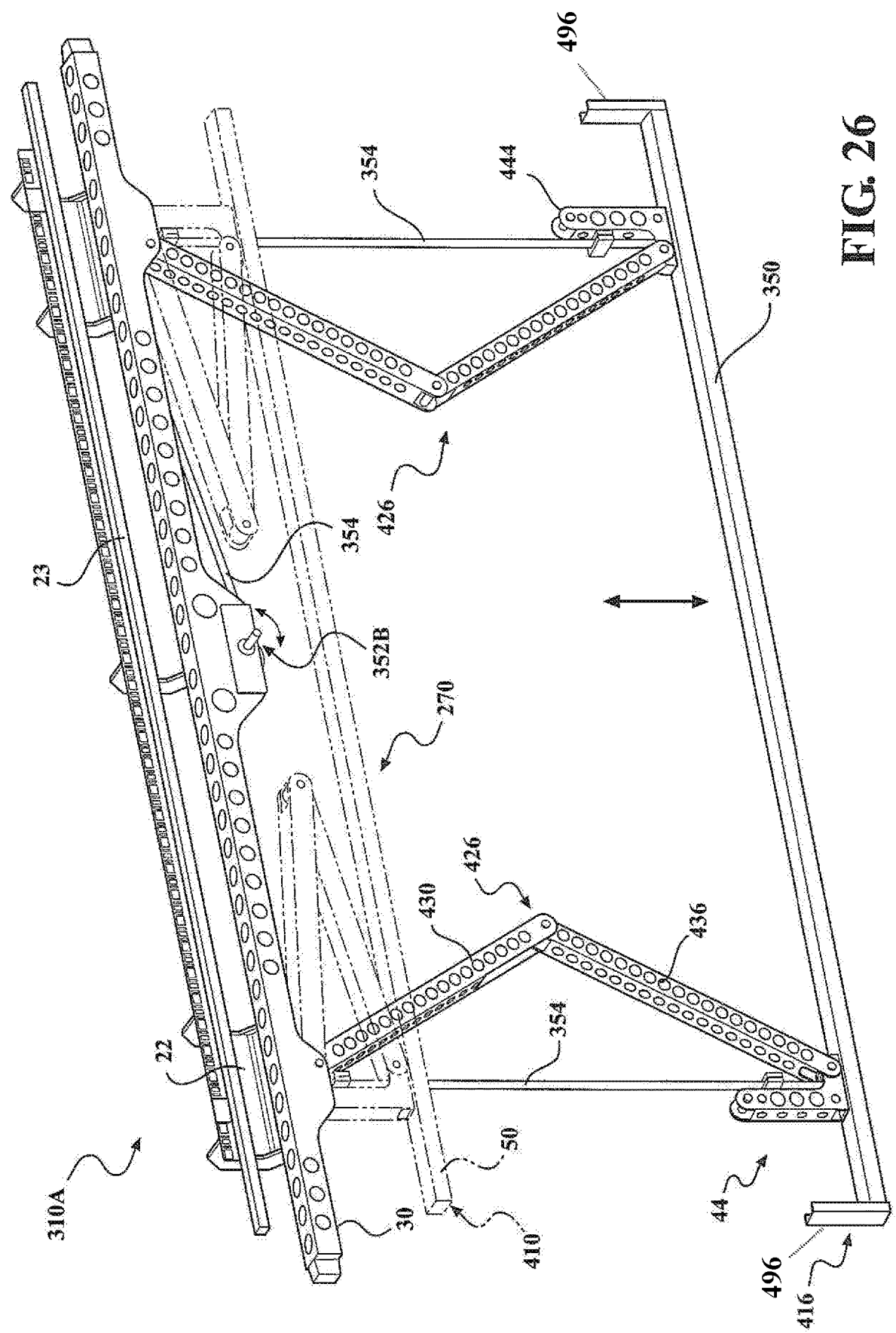
FIG. 26 is a perspective view of an alternate example of the transport carrier showing the carrier in both a raised and a lowered position.

Referring to FIGS. 26-30, an alternate example of a transport carrier 310A, carrier 27D, and lift mechanism 352B shown in FIGS. 17 and 18A and B is illustrated. Referring to FIG. 26, carrier 27D is shown both in a raised 410 (shown in phantom lines) and a lowered 416 position, although it is understood that support beam 350 could not be in both positions at the same time in this example as shown for ease of illustration. The example carrier 27D shown in FIGS. 26-30 is of the scissors-type 426 lift mechanism 352B including first link 430 and second link 436 as generally described above for FIGS. 17 and 18A and B. Alternate parts and assemblies may be different than examples described above as generally shown. A platform 346 (not shown) could also be used to suit the particular application and workpiece (s) 146 (not shown). In the example, the support member 30, first link 430, second link 436 are made from aluminum or steel including a plurality of apertures to maintain strength and reduce weight of the individual components and system 10, 310 as a whole.

In the example shown in FIGS. 26-29, alternate lifting mechanism 352B is similar in construction and components, and the alternatives described therefore, as lifting mechanism 352A as described above, for example motor 357, ratchet mechanism 356, motor 357, drum 372 and tether 354 as illustrated in FIGS. 17-19. It is understood that the example shown in FIGS. 26-30 could also take the form of the scissors 426, including first link 430 and second link 436 oriented outward as shown in FIG. 19.

Figure 29:
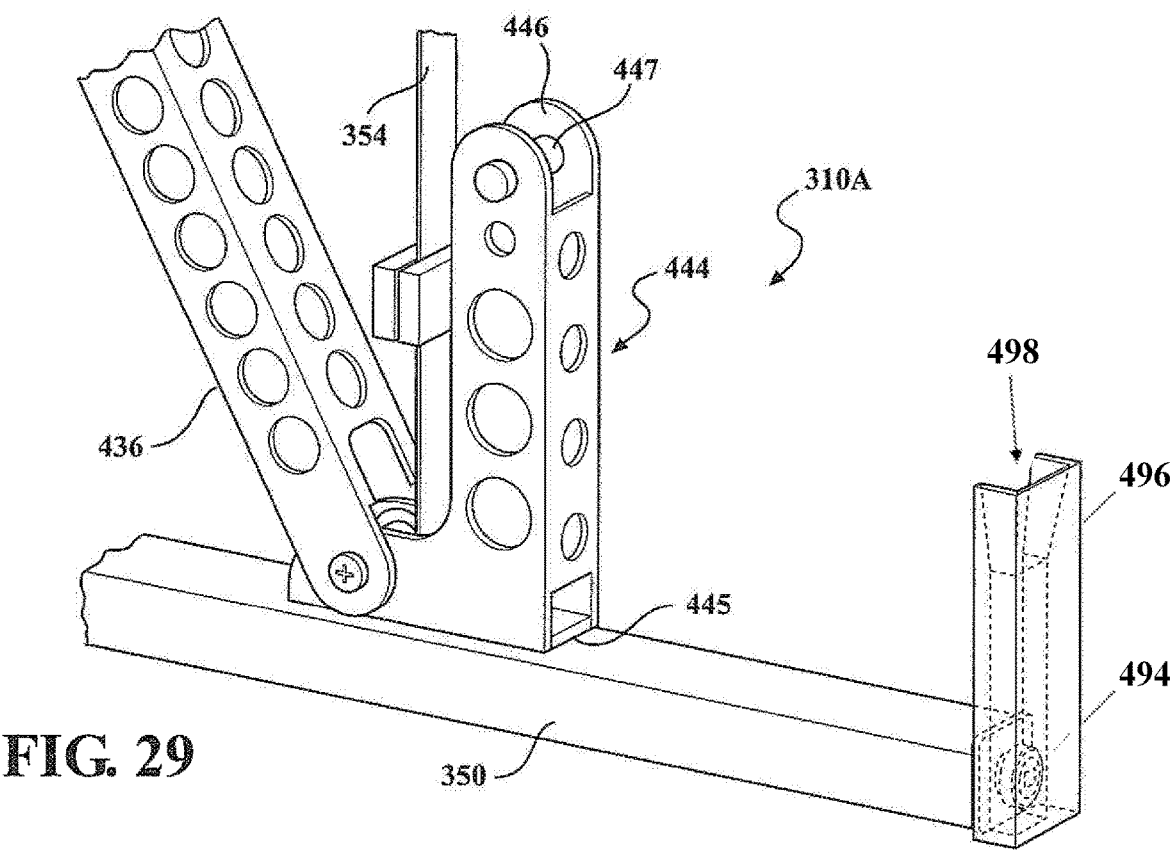
FIG. 29 is an enlarged partial perspective view of a portion of the transport carrier of FIG. 26.
Figure 30:
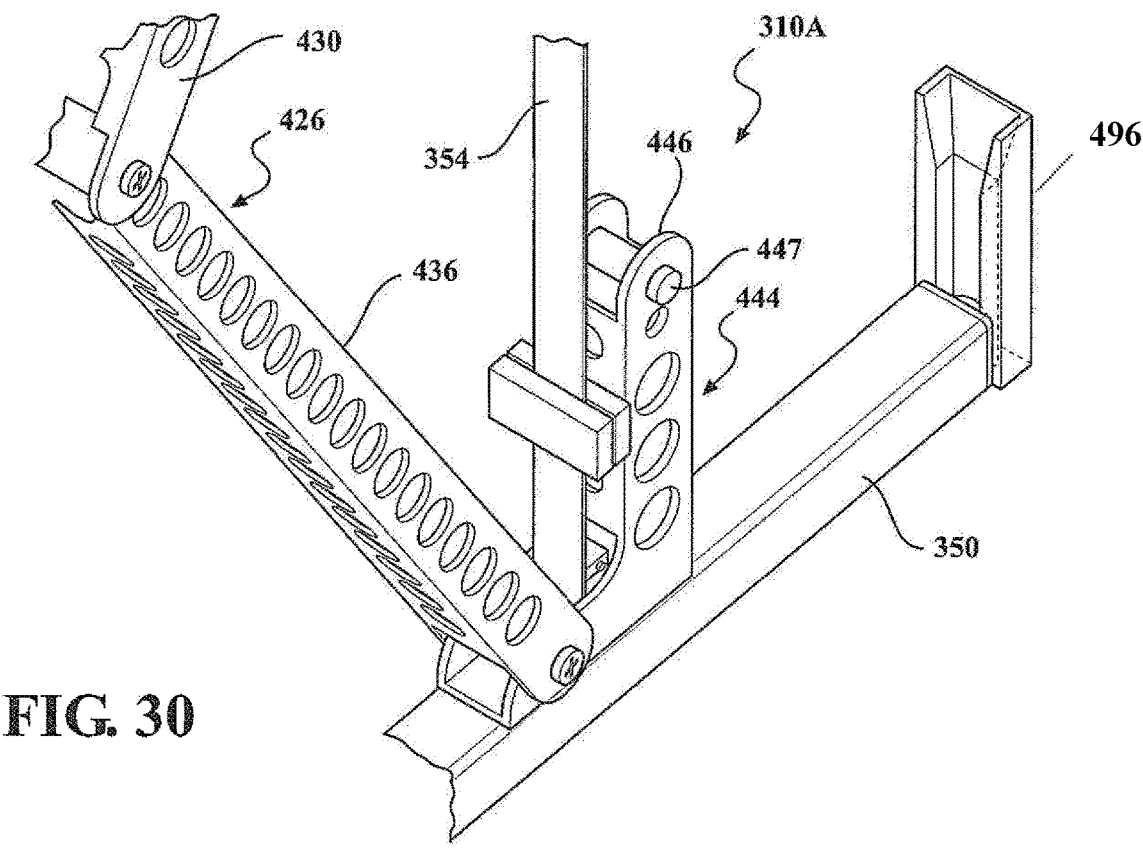
FIG. 30 is an enlarged alternate perspective view of a portion of the transport carrier of FIG. 26.

As best seen in FIGS. 26, 29 and 30, carrier lift 310A carrier 27D includes a foot member 444 which connects to workpiece support member 350 at a lower end 445 and serves as a connection or anchor pivot point 440 for the second link 436. In the example, foot 444 includes an opposing upper end 446 including a locating pin 447 as generally shown.

Figure 27:
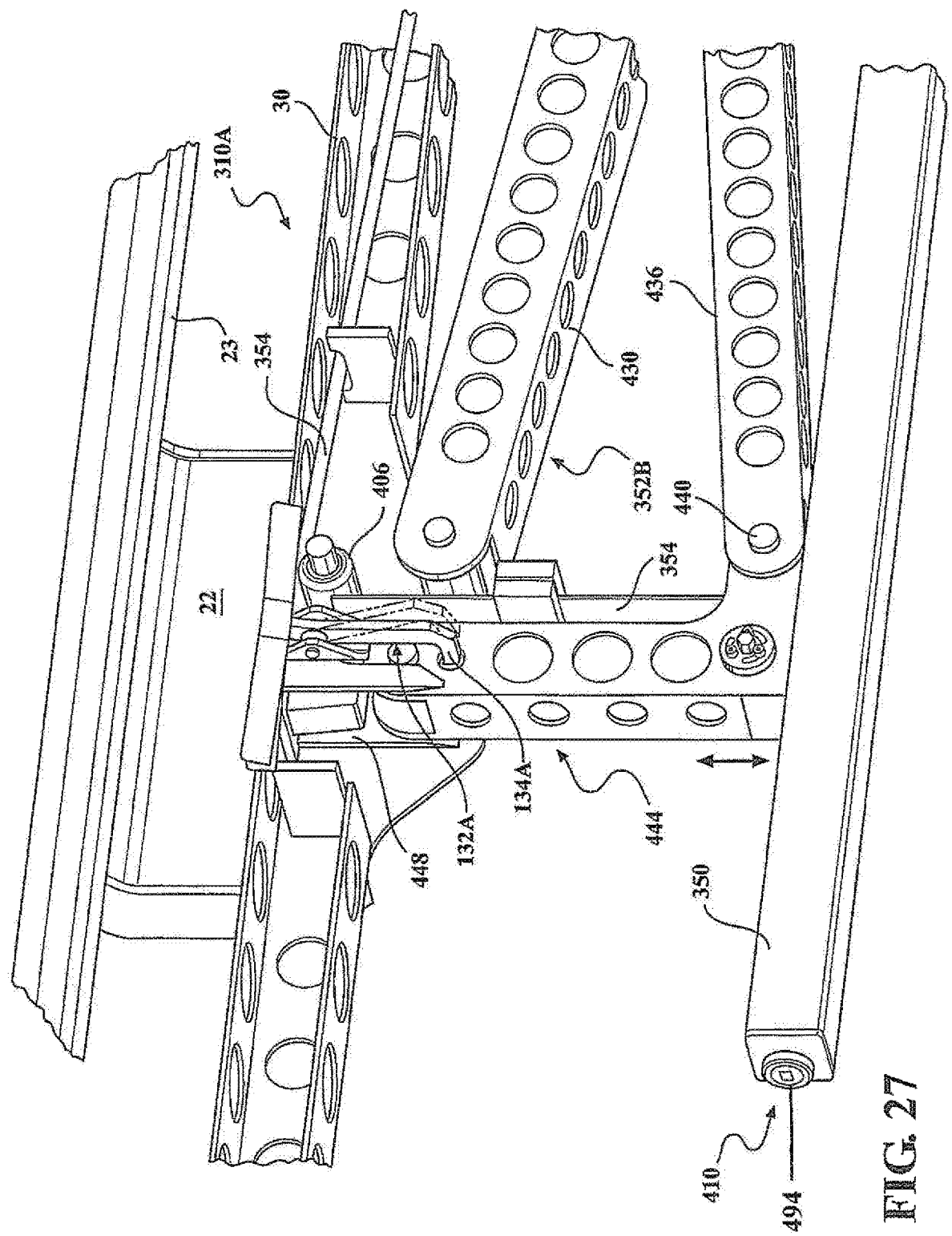
FIG. 27 is an enlarged perspective view of a portion of the transport carrier of FIG. 26 in a raised position.
Figure 28:
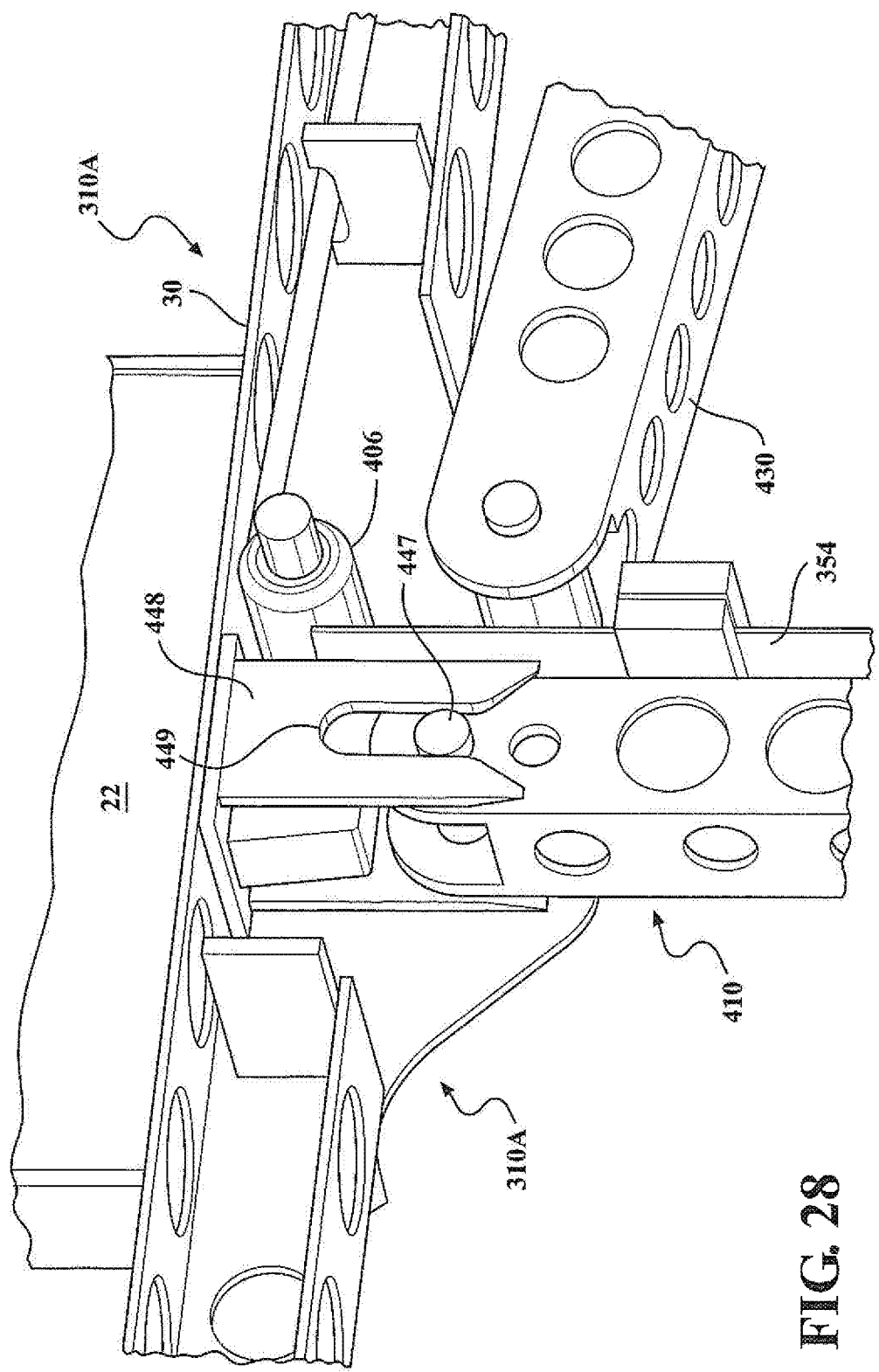
FIG. 28 is an enlarged partial perspective view of a portion of the transport carrier of FIG. 26.

As best seen in FIGS. 27 and 28, carrier 27D includes a guide fork 448 connected to support member 30. In the example, guide fork 448 defines a pair of aligned slots 449 that are sized and oriented to slidingly receive foot 448 locating pin 447 in the slot when the carrier 310A support beam 350 is positioned in a raised position 410 as generally shown. Guide fork 448 provides the support beam 350, and any workpiece 146 engaged therewith, added stability and control in the directions of the path of travel 21 and laterally when engaged, for example, during transfer of carrier lift 310 between workstations 314. Other devices, constructions, positions and orientations of guide fork 448 may be used as known by those skilled in the art.

Referring to FIG. 27, an example of previously described locking mechanism 132 is shown. In the example, locking mechanism 132A includes a latch arm 134A pivotally connected to guide fork 448. In one example, latch arm 134 is positioned and oriented so that a distal end or hook can engage an aperture, or other feature, in foot 444 when in a lowered or latched position. As described above for locking mechanism 132, when engaged with foot 444, support beam 350 cannot be lowered along travel axis 370. Alternate locking mechanism 132A may be powered, controlled and monitored through actuators and/or sensors in communication with a local or central control system as described above. Other devices and alternatives described for locking mechanism 132 may be used for carrier 310 to suit the particular application and performance specification.

As best seen in FIGS. 27, 29 and 30, the exemplary carrier lift 310A includes a pair of first guide members 494 extending longitudinally outward from opposing ends of the workpiece support beam 350. The exemplary carrier lift further includes a pair of second guide members 496 fixed in position at the workstation. As best seen in FIGS. 29 and 30, each second guide members 496 include a vertical guide channel 498 for sliding receipt of the respective first guide member 494 when the carrier is positioned in the lowered position 416 as shown in FIGS. 26, 29 and 30. In the lowered position, engagement of the first guide member 494 with second guide member 496 locates and securely positions the workpiece support beam 350 and supported workpiece 146 (not shown) in a desired or predetermined position when in the workstation.

Figure 31:
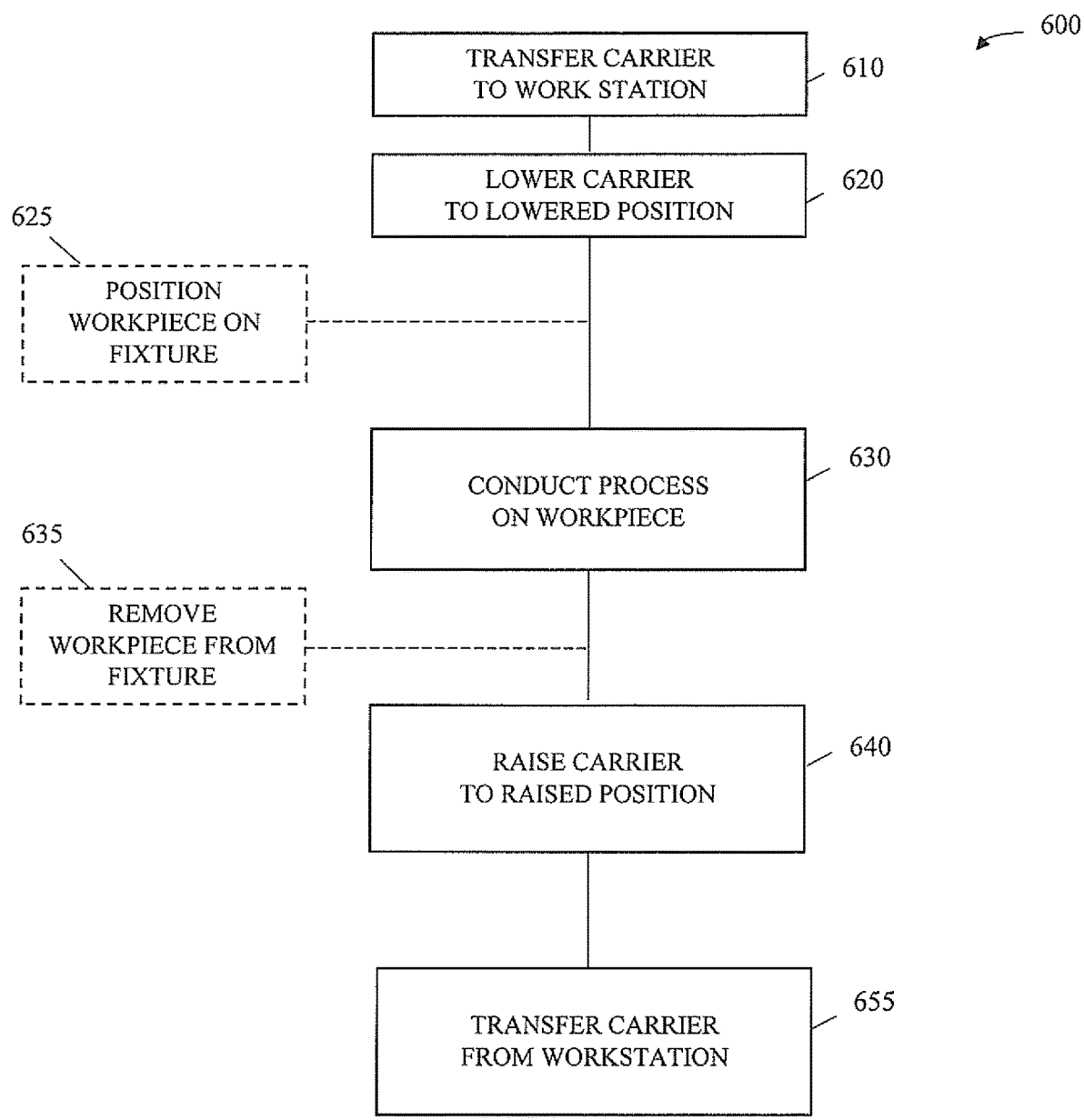
FIG. 31 is a flow chart of an example of a method for selectively raising and lowering a workpiece in a workstation

Referring to FIG. 31, an example of a method 600 for raising and lowering a workpiece 146 in a workstation using a carrier lift 10, 310 is illustrated. In an example and optional first step 610, examples of the above-described carrier lift 10, 310 including exemplary trolley 28 and carrier 27, 27A, B, C or D supporting a workpiece 146 are transferred to a predetermined workstation. As described, the trolley 28 may, as an example, be engaged with an elevated or overhead conveyor 20 that selectively moves along an assembly line path of travel 21 through one or more workstations or predetermined areas along the assembly line. In one example, the assembly line path of travel 21 includes a plurality of sequentially positioned workstations or assembly cells, for example workstations 314, where one or more assembly or manufacturing operations are conducted on a component or subassembly serving as the workpiece 146.

It further understood that the workstation could be a non-assembly or non-manufacturing cell or area, for example a stacker or buffer 510 device, work table 508, or area where workpieces 146 are temporarily stored in fixtures or racks until the workpieces are re-engaged by the carrier 27, 27A-D for further processing or transfer along the assembly line or to another predetermined location or area. For example, the workstation may be a production line buffer wherein workpieces that are in process are temporarily stored or racked, for example cradle 516 in FIG. 22, until needed for the next stage of the assembly or manufacturing process. For example, if there is stoppage along one portion of an assembly line downstream, the upstream or prior assembly process may continue and the workpieces temporarily stored in a buffer rack 516 or area until the downstream process can accept them for further processing. Alternately, the device 10, 310 and process 600 may deliver and lower the workpieces 146 as described in storage racks for longer storage, for example, completed workpieces to be packaged and shipped. Other workstations, processes and applications for carrier lifts 10, 310 and system 600 known by those skilled in the art may be used.

In an exemplary second step 620 a carrier 27, 27A-D supporting the workpiece 146 is selectively lowered from a raised position to a lowered position in the workstation. In an optional step 625, the carrier positions the workpiece 146 in a fixture, tooling, rack or other device positioned in the workstation, for example trunnion fixture 148, work table 508, cradle 516, or tooling 534, used to support and/or manipulate the workpiece 146 as needed for the predetermined process or processes in the workstation. It is understood that the carrier can be lowered (or raised) and stopped at any point along the carrier vertical axis of travel 370 suitable for the particular workstation or process. In one example (not shown), the carrier 27, 27A-D automatically disengages or releases the workpiece 146 from a workpiece support beam 36, 350 through actuation of one or more workpiece engaging devices 147 connected to the support beam 36, 350 as described above. It is understood that carrier 37, 27A-D may begin at a lowered position and raised to the raised position for further processing.

In one example (not shown) the carrier 27, 27A-D is raised from the lower position away from the exemplary fixture or other device supporting the workpiece to provide clearance for the predetermined process or operation to take place on the workpiece.

In one exemplary step (not shown), a buffer 510, cradle 516 (FIG. 22) may be indexed to expose a supported workpiece 146 along the carrier 27, 27A-D travel axis 370, such that support beam 36, 350 may engage the workpiece and transfer the workpiece to another workstation. In another example (not shown), tooling 534 on a shuttle 520 (FIG. 23) may be indexed into a workstation to expose the workpiece for engagement by support beam 36, 350.

In the example, step 630 includes conducting a process on the workpiece. The process or operation may be, for example, welding, brazing, soldering, application of adhesive, riveting, staking, bolting, drilling, machining, polishing and other assembly and/or manufacturing processes, or temporary storage for example in a buffer, known by those skilled in the art (each considered a process or operation as used herein). These processes may be executed by programmable industrial robots (not shown) or other automated or semi-automated devices or manual by an operator.

In an optional step 635 (not shown), opposite to optional step 625, the carrier 27, 27A-C may remove the workpiece 146 from the fixture or other workpiece supporting device. In one example (not shown) described above, the carrier 27, 27A-D will automatically actuate workpiece engaging devices 147 to re-engage or reacquire the workpiece 146 to support beam 36, 350 so that the carrier again supports the workpiece 146. Sensors may be used along with power sources to determine the position of the support beam 36, 350 relative to workpiece 146 in order to actuate the workpiece engaging devices 147 to re-engage or removably connect the support beam 36, 350 to the workpiece 146. It is understood that, depending on the application and assembly process, steps 625 and 635 can be switched. For example, step 625 can be that carrier lift 10, 310 first goes to, for example, a stacker or buffer 510, or a worktable 508, where the workpieces 146 are presently positioned and first engage the workpieces and then removing them (versus carrying workpieces 146 into the workstation and depositing them as first described for step 625 above).

In example step 640, the carrier 27, 27A-D raises the workpiece 146 from the lowered position, for example 416, to a raised position, for example 410, in the workstation. In one step (not shown) a locking mechanism 132, 132A may be actuated to lock or prevent vertical movement of the carrier 27, 27A-D support beam 36, 350 while in a locked position.

In an optional and exemplary step 655, the carrier lift 10, 310 is transferred from the workstation along the assembly line path of travel 21 to the next predetermined workstation or location for further processing or storage. It is understood that the above steps are exemplary and that additional, or fewer, steps, and in different order of sequence, may be used in the manners described above without deviating from the present invention. In one example step not shown, the workstation may include two sequential workstations, for example workstations 314A and B (FIG. 20). One of the workstations 314A and B may include a manual workstation and the other may include an automated or semi-automated workstation as described above relating to FIG. 20. The carrier 27, 27A-D may move back and forth between the workstations 314A and B as needed depending on the assembly process.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The above drawings are not necessarily to scale and certain features may be exaggerated, removed, or partially sectioned to better illustrate and explain the present invention. Further, the above descriptions set forth herein are not intended to be exhaustive or otherwise limit or restrict the claims to the precise forms and configurations shown in the drawings and disclosed in the following detailed description.

The foregoing description relates to what is presently considered to be the most practical embodiment. It is to be understood, however, that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. A method for manipulating the position of a workpiece in a workstation, the method comprising:
    transferring a trolley engaged with a conveyor along a path of travel to a predetermined position at a workstation, the trolley connected to a carrier having a workpiece support beam operable to support a workpiece, the carrier further including a scissors device comprising:
        a pair of first links pivotally connected to the trolley about respective first axis of rotation, the pair of first links positioned apart along the workpiece support beam;
        a pair of second links, each second link pivotally connected to a respective first link about respective second axis of rotation parallel to the first links first axis of rotation, each of the second links pivotally connected to the workpiece support beam, the scissors device operable to contract and extend in a length along the carrier axis of travel;
    lowering the carrier relative to the trolley by a lifting mechanism from a raised position to a lowered position along a carrier axis of travel in the workstation thereby extending the scissors device;
    conducting a process on the workpiece;

raising the carrier from the lowered position to the raised position in the workstation by the lifting mechanism thereby contracting the scissors device; and transferring the trolley from the predetermined position at the workstation by the conveyor along the path of travel.

2. The method of claim 1 further comprising:

connecting a tether to the workpiece support beam;

engaging the tether with a rotatable drum mounted to the trolley; and energizing a motor engaged with the drum to selectively rotate the drum to spool a length of the tether onto the drum raising the workpiece support beam relative to the trolley or unspool the length of the tether from the drum lowering the workpiece support beam relative to the trolley along the carrier axis of travel.

3. The method of claim 1 wherein the carrier further includes a first guide member positioned on the workpiece support beam and the workstation includes a second guide member stationarily positioned in alignment with the first guide member, the method comprising:

engaging the first guide member with the second guide member on lowering the carrier to the lowered position to position the workpiece support member in a predetermined position in the workstation.

4. The method of claim 1 wherein the trolley includes a pair of forks and the workpiece support beam including a pair of foot members each including a locating pin in alignment with the trolley forks along the carrier axis of travel, the method comprising:

engaging each foot locating pin with a respective trolley fork when the carrier is in the raised position to secure the workpiece support beam in the carrier raised position.

5. A method for manipulating the position of a workpiece in a workstation, the method comprising:

transferring a trolley engaged with a conveyor along a path of travel to a predetermined position at a workstation, the trolley connected to a carrier having a workpiece support beam operable to support a workpiece;

connecting a tether to the workpiece support beam;

engaging the tether with a rotatable drum mounted to the trolley;

engaging a motor stationarily mounted in the workstation with a ratchet coupler connected to the drum when the carrier is positioned at the predetermined position at the workstation;

energizing and selectively rotating the motor engaged with the ratchet coupler to selectively rotate the drum to unspool a length of the tether from the drum lowering the workpiece support beam relative to the trolley by a lifting mechanism from a raised position to a lowered position along a carrier axis of travel in the workstation;

conducting a process on the workpiece;

energizing and selectively rotating the motor engaged with the ratchet coupler to selectively rotate the drum to spool the length of the tether onto the drum raising the workpiece support beam from the lowered position to the raised position in the workstation by the lifting mechanism; and transferring the trolley from the predetermined position at the workstation by the conveyor along the path of travel.

6. A method for manipulating the position of a workpiece in a workstation, the method comprising:

transferring a trolley engaged with a conveyor along a path of travel to a predetermined position at a workstation, the trolley connected to a carrier comprising one of a scissors device or a telescopic post device connected trolley and having a workpiece support beam operable to support a workpiece;

disengaging a locking mechanism from one of a foot connected to the workpiece support beam or the telescopic post device permitting the lowering of the carrier from a raised position to the lowered position;

lowering the carrier relative to the trolley by a lifting mechanism from the raised position to the lowered position along a carrier axis of travel in the workstation thereby extending respective one of the scissors device or the telescopic post device;

conducting a process on the workpiece;

raising the carrier from the lowered position to the raised position in the workstation by the lifting mechanism thereby contracting respective one of the scissors device or the telescopic post device; and transferring the trolley from the predetermined position at the workstation by the conveyor along the path of travel.

7. A method for manipulating the position of a workpiece in a workstation, the method comprising:

transferring a trolley engaged with a conveyor along a path of travel to a predetermined position at a workstation, the trolley connected to a carrier having a workpiece support beam operable to support a workpiece, the carrier further comprising a workpiece engaging device connected to the workpiece support beam operable to selectively engage the workpiece;

lowering the carrier relative to the trolley by a lifting mechanism from a raised position to a lowered position along a carrier axis of travel in the workstation;

one of disengaging or engaging the workpiece by the workpiece engaging device while the workpiece support beam is positioned at the lowered position in the workstation;

conducting a process on the workpiece;

raising the carrier from the lowered position to the raised position in the workstation by the lifting mechanism; and transferring the trolley from the predetermined position at the workstation by the conveyor along the path of travel.

8. The method of claim 7 wherein the workstation includes a stationary power source positioned along the carrier axis of travel and the workpiece support beam includes a complimentary power connector in electric communication with the workpiece engaging device, the method further comprising:

automatically engaging the workpiece support beam power connector to the stationary power source when the carrier is positioned in the lowered position;

providing electric power to the workpiece engaging device to selectively actuate the workpiece engaging device to engage or disengage the workpiece.

9. The method of claim 7 further comprising the steps of:

engaging the workpiece with a fixture positioned in the workstation at the carrier lowered position;

disengaging the workpiece from the workpiece support beam by the workpiece engaging device prior to conducting the process on the workpiece; and re-engaging the workpiece to the workpiece support beam by the workpiece engaging device following conducting the process on the workpiece.

10. The method of claim 9 wherein the fixture positioned in the workstation comprises a trunnion fixture, the step of conducting a process on the workpiece further comprises:

rotating the trunnion fixture and the engaged workpiece about a trunnion fixture axis of rotation to a predetermined rotated position for the workpiece.

11. The method of claim 7 wherein the workstation comprises one of a buffer or a cradle, the method further comprising the steps of:

indexing the buffer or the cradle to expose the workpiece for engagement of the workpiece by the workpiece engaging device;

lowering the workpiece support beam to the lowered position by the lifting mechanism;

engaging the workpiece to the workpiece support beam by the workpiece engaging device; and removing the workpiece from the buffer or cradle by raising the workpiece support beam by the lifting mechanism.

12. The method of claim 7 wherein the workstation comprises a workpiece shuttle positioned transverse to the path of travel, the method further comprising the step of:

indexing the workpiece shuttle to expose the workpiece for engagement of the workpiece by the workpiece engaging device;

lowering the workpiece support beam to the lowered position by the lifting mechanism;

engaging the workpiece to the workpiece support beam by the workpiece engaging device; and removing the workpiece from the workpiece shuttle by raising the workpiece support beam by the lifting mechanism.

13. A method for manipulating the position of a workpiece in a workstation, the method comprising:

transferring a trolley engaged with a conveyor along a path of travel to a predetermined position at a workstation, the trolley connected to a carrier comprising a workpiece support beam operable to support a workpiece, the carrier further comprising a pair of telescopic post devices positioned apart along the workpiece support beam, each telescopic post device connected to the trolley and the workpiece support beam;

lowering the carrier relative to the trolley by a lifting mechanism from a raised position to a lowered position along a carrier axis of travel in the workstation thereby extending the telescopic post device;

conducting a process on the workpiece;

raising the carrier from the lowered position to the raised position in the workstation by the lifting mechanism thereby contracting the telescopic post device; and transferring the trolley from the predetermined position at the workstation by the conveyor along the path of travel.

14. The method of claim 13 wherein the carrier further includes a workpiece engaging device connected to the workpiece support beam operable to selectively engage the workpiece, the method further comprising the steps of:

one of disengaging or engaging the workpiece by the workpiece engaging device while the workpiece support beam is positioned at the lowered position in the workstation.

* * * * *